(12) United States Patent
Mizrahi

(10) Patent No.: US 8,796,580 B2
(45) Date of Patent: *Aug. 5, 2014

(54) PROCESSES FOR WELDING COMPOSITE MATERIALS AND ARTICLES THEREFROM

(75) Inventor: Shimon Mizrahi, Haifa (IL)

(73) Assignee: Productive Research, Farmington, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 12/978,974

(22) Filed: Dec. 27, 2010

(65) Prior Publication Data

US 2011/0188927 A1 Aug. 4, 2011

Related U.S. Application Data

(60) Provisional application No. 61/387,164, filed on Sep. 28, 2010, provisional application No. 61/377,599, filed on Aug. 27, 2010, provisional application No. 61/371,360, filed on Aug. 6, 2010, provisional application No. 61/290,384, filed on Dec. 28, 2009.

(51) Int. Cl.
*B23K 11/11* (2006.01)
*B23K 11/00* (2006.01)
*F16B 12/06* (2006.01)

(52) U.S. Cl.
USPC .............. 219/118; 219/91.2; 403/271

(58) Field of Classification Search
USPC ........ 428/213, 215, 297.4, 300.7, 301.1, 450, 428/457, 458, 475.5, 626; 403/271; 219/91.2, 118
See application file for complete search history.

(56) References Cited

U.S. PATENT DOCUMENTS

| 213,015 A | 3/1879 | Wahl et al. |
| 777,656 A | 12/1904 | Banning |
| 1,972,835 A | 9/1934 | Tainton |

(Continued)

FOREIGN PATENT DOCUMENTS

| CA | 2700549 A1 | 4/2009 |
| CH | 284305 | 7/1952 |

(Continued)

OTHER PUBLICATIONS

Kim et al., "Forming and Failure Behaviour of Coated, Laminated and Sandwiched Sheet Metals: A Review", J. of Mat. Processing Tech., 63 (1997) 38-42.

(Continued)

*Primary Examiner* — Jianying Atkisson
(74) *Attorney, Agent, or Firm* — The Dobrusin Law Firm, P.C.

(57) ABSTRACT

The invention is directed at a method for welding a composite material and to welded structures thus prepared. The method includes a step of contacting a substrate material with a composite material, wherein the composite material includes a pair of spaced apart steel sheets and a core layer between the sheets; the volume of the core layer is about 25 volume % or more, based on the total volume of the composite material; the core layer includes a plurality of steel fibers arranged in one or more masses of fibers that extend the thickness of the core layer so that the core layer is in electrical communication with the steel sheets; and the steel fibers have a cross sectional area perpendicular to the length of the fibers from about $1 \times 10^{-5}$ mm$^2$ to about $2.5 \times 10^{-2}$ mm$^2$.

1 Claim, 6 Drawing Sheets

(56) References Cited

U.S. PATENT DOCUMENTS

| | | | |
|---|---|---|---|
| 2,286,980 A | 6/1942 | Schanz | |
| 3,086,899 A | 4/1963 | Smith et al. | |
| 3,112,213 A | 11/1963 | Lusa | |
| 3,205,337 A | 9/1965 | Hiemenz | |
| 3,527,667 A | 9/1970 | Larsen et al. | |
| 3,764,277 A | 10/1973 | Hollis | |
| 3,832,433 A | 8/1974 | Schaffer et al. | |
| 3,900,651 A * | 8/1975 | Hoppe et al. | 428/86 |
| 3,969,868 A | 7/1976 | Bainter et al. | |
| 4,037,073 A * | 7/1977 | Becker | 219/92 |
| 4,048,355 A | 9/1977 | Sakayori et al. | |
| 4,110,117 A | 8/1978 | McLeod | |
| 4,110,505 A | 8/1978 | Prewo | |
| 4,171,394 A | 10/1979 | Patil et al. | |
| 4,255,482 A | 3/1981 | Udagawa | |
| 4,267,679 A | 5/1981 | Thompson | |
| 4,313,996 A | 2/1982 | Newman et al. | |
| 4,329,561 A * | 5/1982 | Schafer et al. | 219/110 |
| 4,330,587 A | 5/1982 | Woodbrey | |
| 4,353,951 A | 10/1982 | Yukitoshi et al. | |
| 4,369,222 A | 1/1983 | Hedrick et al. | |
| 4,383,942 A | 5/1983 | Davenport | |
| 4,421,892 A | 12/1983 | Kasahara et al. | |
| 4,424,254 A | 1/1984 | Hedrick et al. | |
| 4,429,076 A | 1/1984 | Saito et al. | |
| 4,461,665 A | 7/1984 | Schertler | |
| 4,482,600 A * | 11/1984 | Matsumoto et al. | 428/213 |
| 4,513,033 A | 4/1985 | Patil et al. | |
| 4,522,875 A | 6/1985 | Still, Jr. et al. | |
| 4,601,941 A | 7/1986 | Lutz et al. | |
| 4,617,231 A * | 10/1986 | Hamada et al. | 428/299.1 |
| 4,650,723 A | 3/1987 | Furuya | |
| 4,650,951 A * | 3/1987 | Koga et al. | 219/118 |
| 4,668,545 A * | 5/1987 | Lowe | 428/35.1 |
| 4,678,699 A | 7/1987 | Gregor et al. | |
| 4,678,707 A | 7/1987 | Shinozaki et al. | |
| 4,690,856 A | 9/1987 | Ito et al. | |
| 4,749,623 A | 6/1988 | Endo et al. | |
| 4,753,850 A | 6/1988 | Ibe et al. | |
| 4,758,627 A | 7/1988 | Wilkus et al. | |
| 4,759,972 A | 7/1988 | Yoshiga et al. | |
| 4,759,994 A | 7/1988 | Lesourd | |
| 4,788,099 A | 11/1988 | Fukushima et al. | |
| 4,792,499 A | 12/1988 | Shindou et al. | |
| 4,794,050 A | 12/1988 | Campbell et al. | |
| 4,857,377 A | 8/1989 | Daimon et al. | |
| 4,873,149 A | 10/1989 | Shinoda et al. | |
| 4,888,247 A | 12/1989 | Zweben et al. | |
| 4,937,125 A | 6/1990 | Lepoetre et al. | |
| 4,978,582 A | 12/1990 | Stamm et al. | |
| 5,030,488 A | 7/1991 | Sobolev | |
| 5,030,816 A | 7/1991 | Strecker | |
| 5,047,479 A | 9/1991 | Ohmae et al. | |
| 5,061,778 A | 10/1991 | Uchida et al. | |
| 5,063,098 A | 11/1991 | Niwa et al. | |
| 5,084,357 A | 1/1992 | Imai et al. | |
| 5,093,204 A | 3/1992 | Watanabe et al. | |
| 5,100,737 A | 3/1992 | Colombier et al. | |
| 5,216,075 A | 6/1993 | Papazoglou | |
| 5,219,629 A | 6/1993 | Sobolev | |
| 5,227,216 A | 7/1993 | Pettit | |
| 5,278,231 A | 1/1994 | Chundury | |
| 5,347,099 A | 9/1994 | Gissinger et al. | |
| 5,354,607 A | 10/1994 | Swift et al. | |
| 5,410,133 A | 4/1995 | Matsen et al. | |
| 5,418,073 A | 5/1995 | Loth et al. | |
| 5,489,180 A | 2/1996 | Ichihara et al. | |
| 5,518,836 A | 5/1996 | McCullough | |
| 5,548,027 A | 8/1996 | Heucher et al. | |
| 5,578,384 A | 11/1996 | Kingston | |
| 5,604,033 A | 2/1997 | Arthurs et al. | |
| 5,658,264 A | 8/1997 | Samson | |
| 5,679,441 A | 10/1997 | Saelens et al. | |
| 5,691,037 A | 11/1997 | McCutcheon et al. | |
| 5,753,885 A | 5/1998 | Iwasa et al. | |
| 5,846,461 A | 12/1998 | Collins et al. | |
| 5,866,868 A | 2/1999 | Hirane | |
| 5,894,045 A | 4/1999 | Desrondiers | |
| 5,939,213 A | 8/1999 | Bowden et al. | |
| 5,939,512 A | 8/1999 | Gervasi et al. | |
| 5,951,800 A | 9/1999 | Pettit | |
| 6,126,865 A | 10/2000 | Haak et al. | |
| 6,146,488 A | 11/2000 | Okada et al. | |
| 6,202,462 B1 | 3/2001 | Hansen et al. | |
| 6,268,408 B1 | 7/2001 | Dispenza | |
| 6,346,292 B1 | 2/2002 | Grubb et al. | |
| 6,346,491 B1 | 2/2002 | DeAngelis et al. | |
| 6,387,535 B1 | 5/2002 | Mantel | |
| 6,428,905 B1 | 8/2002 | Behr et al. | |
| 6,455,148 B1 | 9/2002 | Spears et al. | |
| 6,465,110 B1 | 10/2002 | Boss et al. | |
| 6,534,194 B2 | 3/2003 | Weihs et al. | |
| 6,592,968 B1 | 7/2003 | Schmit et al. | |
| 6,764,772 B2 | 7/2004 | Clyne et al. | |
| 6,841,212 B2 | 1/2005 | Bicakci-Jenkins et al. | |
| 6,841,252 B2 | 1/2005 | Kroes et al. | |
| 6,861,156 B2 | 3/2005 | Palm | |
| 6,865,805 B2 | 3/2005 | Dispenza et al. | |
| 7,157,140 B1 | 1/2007 | Hoppe et al. | |
| 7,390,564 B2 | 6/2008 | Yuasa et al. | |
| 7,592,388 B2 | 9/2009 | Wick et al. | |
| 7,648,058 B2 | 1/2010 | Straza | |
| 7,927,708 B2 | 4/2011 | Mizrahi | |
| 8,328,971 B2 | 12/2012 | Kia et al. | |
| 2002/0160180 A1 | 10/2002 | Yamamoto et al. | |
| 2003/0064241 A1 | 4/2003 | Suzuki et al. | |
| 2003/0082335 A1 | 5/2003 | Clyne et al. | |
| 2003/0099857 A1 | 5/2003 | Nomura et al. | |
| 2003/0162049 A1 | 8/2003 | Kroes et al. | |
| 2004/0116602 A1 | 6/2004 | Botros | |
| 2004/0227688 A1 | 11/2004 | Aisenbrey | |
| 2004/0233112 A1 | 11/2004 | Aisenbrey | |
| 2004/0244789 A1 * | 12/2004 | Jentgens | 125/16.02 |
| 2004/0247927 A1 | 12/2004 | Kurz | |
| 2005/0000947 A1 * | 1/2005 | Sigler | 219/118 |
| 2005/0133575 A1 | 6/2005 | Gayden et al. | |
| 2005/0208251 A1 | 9/2005 | Aisenbrey | |
| 2005/0214553 A1 | 9/2005 | Yannetti et al. | |
| 2006/0010807 A1 | 1/2006 | Whitley | |
| 2006/0060296 A1 | 3/2006 | Sigler et al. | |
| 2006/0134395 A1 | 6/2006 | Sigler et al. | |
| 2006/0134449 A1 | 6/2006 | Sigler et al. | |
| 2006/0134450 A1 | 6/2006 | Sigler et al. | |
| 2006/0222869 A1 | 10/2006 | Cai et al. | |
| 2006/0269701 A1 | 11/2006 | Gauriat et al. | |
| 2006/0286333 A1 | 12/2006 | Wang et al. | |
| 2007/0062758 A1 | 3/2007 | Jensen et al. | |
| 2007/0104966 A1 | 5/2007 | Calvez et al. | |
| 2007/0186614 A1 | 8/2007 | Pinard | |
| 2007/0187469 A1 | 8/2007 | Chen et al. | |
| 2007/0196637 A1 | 8/2007 | Good et al. | |
| 2007/0295704 A1 | 12/2007 | Sigler et al. | |
| 2008/0036251 A1 | 2/2008 | Endo et al. | |
| 2008/0081149 A1 | 4/2008 | Fuerst et al. | |
| 2008/0311363 A1 * | 12/2008 | Haskett et al. | 428/212 |
| 2009/0142538 A1 | 6/2009 | Sigler et al. | |
| 2009/0226755 A1 | 9/2009 | Sigler et al. | |
| 2009/0280348 A1 | 11/2009 | Patberg et al. | |
| 2010/0035080 A1 | 2/2010 | Sigler et al. | |
| 2010/0084380 A1 | 4/2010 | Tetzlaff et al. | |
| 2010/0098929 A1 | 4/2010 | Dispenza | |
| 2010/0196736 A1 | 8/2010 | Boger et al. | |
| 2010/0233505 A1 | 9/2010 | Boger et al. | |

FOREIGN PATENT DOCUMENTS

| | | |
|---|---|---|
| CH | 287794 | 12/1952 |
| CH | 406580 | 1/1966 |
| CN | 1649724 A | 8/2005 |
| DE | 877057 | 5/1953 |
| DE | 1912948 | 10/1970 |
| DE | 1729057 | 6/1971 |
| DE | 3622781 A1 | 1/1988 |
| DE | 4019202 A1 | 12/1991 |

(56) References Cited

FOREIGN PATENT DOCUMENTS

| | | |
|---|---|---|
| DE | 4141343 A1 | 5/1993 |
| DE | 4307563 A1 | 9/1993 |
| DE | 4300283 A1 | 7/1994 |
| DE | 19633306 A1 | 10/1997 |
| DE | 19724361 A1 | 1/1998 |
| DE | 19740844 A1 | 3/1999 |
| DE | 19810706 A1 | 9/1999 |
| DE | 19919783 | 11/2000 |
| DE | 19926379 A1 | 12/2000 |
| DE | 10011589 A | 9/2001 |
| DE | 10240384 A1 | 3/2004 |
| DE | 102004022677 A1 | 5/2004 |
| DE | 202004015784 | 4/2005 |
| DE | 102006013529 A1 | 10/2006 |
| DE | 102006049014 A1 | 4/2008 |
| DE | 102006049015 A1 | 4/2008 |
| EP | 19835 A1 | 12/1980 |
| EP | 69401 | 1/1983 |
| EP | 32355 B1 | 5/1984 |
| EP | 208443 | 6/1986 |
| EP | 249442 A2 | 12/1987 |
| EP | 311722 A1 | 4/1989 |
| EP | 322947 B1 | 7/1989 |
| EP | 335642 A2 | 10/1989 |
| EP | 354521 A2 | 2/1990 |
| EP | 356837 B1 | 3/1990 |
| EP | 642920 A2 | 3/1995 |
| EP | 888880 A1 | 1/1999 |
| EP | 1034920 | 9/2000 |
| EP | 1044796 A2 | 10/2000 |
| EP | 1095718 A1 | 5/2001 |
| EP | 1197323 A1 | 4/2002 |
| EP | 1491328 A1 | 12/2004 |
| EP | 1504892 A1 | 2/2005 |
| FR | 1245009 | 11/1960 |
| GB | 2062057 A | 5/1981 |
| GB | 2332875 A | 7/1999 |
| JP | 54-52182 A | 4/1979 |
| JP | 56132709 A | 10/1981 |
| JP | S58-142845 A | 8/1983 |
| JP | S58-180037 U | 12/1983 |
| JP | S58-180037 U | 12/1983 |
| JP | 61010445 A | 1/1986 |
| JP | S61010445 A | 1/1986 |
| JP | 61029262 U | 7/1986 |
| JP | S63-242536 A | 10/1986 |
| JP | 63242536 A | 10/1988 |
| JP | H01-108207 A | 4/1989 |
| JP | 1154876 A1 | 6/1989 |
| JP | 01-263043 A | 10/1989 |
| JP | 2050827 A | 2/1990 |
| JP | H02-297432 A | 7/1990 |
| JP | 02-231134 A | 9/1990 |
| JP | 2297432 A | 12/1990 |
| JP | 03-193443 A | 8/1991 |
| JP | 04-077245 A | 3/1992 |
| JP | 04-094928 vA | 3/1992 |
| JP | 04-282239 A | 7/1992 |
| JP | 05-039560 A | 2/1993 |
| JP | 05-039561 A | 2/1993 |
| JP | 5050553 A | 3/1993 |
| JP | 05-138802 A | 6/1993 |
| JP | 5-162237 A | 6/1993 |
| JP | 05-229054 A | 9/1993 |
| JP | 05-229055 A | 9/1993 |
| JP | 06-071806 A | 3/1994 |
| JP | 06-198802 A | 7/1994 |
| JP | 08-224827 A | 9/1996 |
| JP | 09087528 A * | 3/1997 | ............ C08L 101/00 |
| JP | 63-158242 A | 7/1998 |
| JP | H11-123790 A | 5/1999 |
| JP | 2000-263697 A | 9/2000 |
| JP | 2001-192792 A | 7/2001 |
| NL | 8203423 A | 4/1984 |
| RU | 2149788 C1 | 5/2000 |
| WO | 95/27975 A1 | 10/1995 |
| WO | 99/29492 A1 | 6/1999 |
| WO | 99/46461 A1 | 9/1999 |
| WO | 00/13892 A1 | 3/2000 |
| WO | 03/037970 A1 | 5/2003 |
| WO | 2007/062061 A2 | 5/2007 |
| WO | 2008/118694 A1 | 10/2008 |
| WO | 2009/027480 A1 | 3/2009 |
| WO | 2009/043777 A2 | 4/2009 |
| WO | 2009/135786 A1 | 11/2009 |
| WO | 2010021899 A1 | 2/2010 |

OTHER PUBLICATIONS

Mohr et al. Development of Formable Sandwich Seets for Automotive Applications, Adv. Eng. Materials, 7 (2005) 243-246.
Kim et al., "Formability of AA5182/polypropylene/AA5182 Sandwhich Sheets", J. of Mat. Processing Tech., 139 (2003) 1-7.
Weiss et al. "The Influence on Temperature on the Forming Behavior of Metal/Polymer Laminates in Sheet Metal Forming", Transactions of the ASME, 129 ( 2007) 530-537.
Shinozaki et al. "Spot-Weldable Composite Damping Sheets" www.jfe-steel.co.jp/archives/ksc_giho/16-4/j16-288-295.pdf.
PCT International Search Report, PCT/US2009/053676, Productive Research LLC, mailed Dec. 23, 2009.
"The Effect of Electrical Resistance on Nugget Formation During Spot Welding", J.G. Kaiser, G.J. Dunn, and T.W. Eagar, Welding Research Supplement, Jun. 1982, pp. 167-s to 174-s.
PCT International Search Report, PCT/US2010/0062138, Productive Research LLC, mailed Mar. 18, 2011.
PCT International Search Report, PCT/US2011/024829, Productive Research LLC, mailed May 10, 2011.
Co-Pending U.S. Appl. No. 13/027,423, filed Feb. 15, 2011 by Mizrahi et el.
Co-Pending U.S. Appl. No. 13/052,292, filed Mar. 21, 2011 by Mizrahi et al.
Abstract for: Dunnand, M., et al., "USILIGHT: A cost effective solution to lighten cars", SAE Technical Paper Series, Apr. 3-6, 2006, pp. 1-10.
Abstract for: Guttman, H., et al., "Galfan—A new Coating for Automotive Tubing", SAE Technical Paper 860274, 1986.
Abstract for: Herrschaft, D. et al., "Galfan—A New Zinc-Alloy Coated Steel for Automotive Body Use", SAE Technical Paper 860517, 1983.
Abstract for: Murase, M., et al., "Development of vibration damping steel sheets for automobile oil pans", SAE Internation Congress and Exposition, Mar. 1-5, 1993; Paper No. 930023; Kawasaki Steel Corp.
Abstract for: Shimizu, T. et al., "Application of hot-dip Zn-6%Al-3%Mg Alloy Coated Steel Sheet to Automotive Body", SAE Technical Paper No. 2005-01-1330, SAE 2005 World Congress & Exhibition, Apr. 2005.
Abstract for: Welch, T. et al., "Cost and Performance Benefits for Laminated Steel Body", SAE Technical Paper 1999-01-1784, 1999.
Co-Pending U.S. Appl. No. 13/399,459, filed Feb. 17, 2012 by Mizrahi et al.
Gunnink, J.W. GLARE: An Improved Damage Tolerance Material Proc. 19$^{th}$ European Conference on materials for Aerospace Applications, Dec. 6-8, 2000, pp. 17-24.
Office Action from the U.S. Patent Office for copending U.S. Appl. No. 13/027,423 dated Oct. 24, 2011.
Office Action from the US Patent Office for copending U.S. Appl. No. 13/052,292 dated Nov. 23, 2011.
Office Action from the U.S. Patent Office for copending U.S. Appl. No. 13/027,423 mailed on Apr. 13, 2012.
Office Action from the US Patent Office for copending U.S. Appl. No. 13/052,292 mailed on Apr. 19, 2012.
Office Action from the U.S. Patent Office for copending U.S. Appl. No. 13/027,423 mailed on Aug. 15, 2012.
PCT International Search Report, PCT/US2011/046778, Productive Research LLC, mailed Nov. 10, 2011.
Copending U.S. Appl. No. 12/540,771, filed Aug. 13, 2009, now patent No. 7,927,708 by Mizrahi.

(56) References Cited

OTHER PUBLICATIONS

Copending PCT patent application No. PCT/US2011/46778 filed on Aug. 5, 2011 and published as WO 2012/019115 A1 on Feb. 9, 2012 by Mizrahi et al.

International search report for copending PCT Patent Application PCT/US2012/025619 filed on Feb. 17, 2012 and mailed on May 29, 2012.

Copending PCT Patent Application PCT/US2012/025619 filed on Feb. 17, 2012.

Office Action from the U.S. Patent Office for co-pending U.S. Appl. No. 13/027,423 mailed on Dec. 13, 2012.

Japanese Office Action dated Apr. 24, 2013 for co-pending Japanese Patent Application No. 2011-523874 with brief description prepared by Kiyohara & Co Patent Attorney dated Apr. 26, 2013.

Japanese Office Action dated Apr. 24, 2013 for co-pending Japanese Patent Application No. 2011-523875 with summary of the novelty and inventive step rejections prepared by Kiyohara & Co Patent Attorney dated May 22, 2013.

Link, Todd M. "Formability and Performance of Steel-Plastic Steel Laminated Sheet Materials", SAE 2001 World Congress, Detroit, MI, Mar. 5-8-, 2001.

Miller, William K. "Metal-Plastic Laminates for Vehicle Weight Reduction," SAE Congress and Exposition, Detroi, MI, Feb. 25-29, 1980.

McKenna, L.W. et al., "New Light-Weight Material for Vehicle Body Panels—Aluminum/Nylon Laminates," SAE Congress and Exposition, Detroit, MI, Feb. 25-29, 1980

DiCello, J.A., "Steel-Polypropylene-Steel Laminate—A New Weight Reduction Material," SAE Congress and Exposition, Detroit, MI, Feb. 25-29, 1980.

Haward, R.N., "Strain Hardening of Thermoplastics," Macromolecules 1993, 26, 5860-5869.

Markaki, A.E. and T.W. Clyne "Mechanics of Thin Ultra-Light Stainless Steel Sandwich Sheet Material, Part I. Stiffness," Acta Materialia 51 (2003) 1341-1350.

Markaki, A.E., and T.W. Clyne, "Mechanics of Thin Ultra-Light Stainless Steel Sandwich Sheet Material, Part II. Resistance to Delamination," Acta Materialia 51 (2003) 1351-1357.

Markaki, A.E., S.A. Westgate, and T.W. Clyne, "Stiffness and Weldability of an Ultra-Light Steel Sandwich shhet Maerial with a Fibrous Metal Core," In Processing and Properties of Lightweight Cellular Metals and Structures, TMS, 2002, pp. 15-24.

Mohr, Dirk, "On the Role of Shear Strength in Sandwich Sheet Forming," International Journal of Solids and Structures 42 (2005) 1491-1512.

Sokolova, O. et al, "Metal-polymer-metal sandwiches with local metal reinforcements: A study on formability by deep drawing and bending," Composite Structures, 94 (2011) 1-7.

Shelley, Tom, "Steel Makes Lightweight Fibre Sandwich," Sep. 2001. Downloaded from http://fplreflib.findlay.co.uk/articles/1311/n-sandwich.htm on Jun. 3, 2013.

Weiss, M. et al., "Elastic Bending of Steel-Polymer-Steel Laminates (SPS) to a Constant Curvature," Journal of Applied Mechanics (ASME), 2006, 73 (4): p. 574-579.

Weber, Mark and Musa R. Kamal, Polymer Composites, "Estimaton of the Volume Resistivity of Electrically Conductive Composites"; Dated Dec. 1997, pp. 711-725.

Co-pending U.S. Appl. No. 13/027,423, Office Action dated Mar. 28, 2013.

\* cited by examiner

PROCESSES FOR WELDING COMPOSITE MATERIALS AND ARTICLES THEREFROM

The present application claims the benefit of the filing date of U.S. Provisional Patent Application Nos. 61/290,384 (filed on Dec. 28, 2009), 61/371,360 (filed on Aug. 6, 2010), 61/377,599 (filed on Aug. 27, 2010), and 61/387,164 (filed on Sep. 28, 2010), the contents of which are incorporated herein by reference in their entirety.

FIELD OF THE INVENTION

The present invention relates generally to welding processes for welding of composite materials to a metallic material, to a composite materials, or both, and to articles including a welded composite material, and more specifically to process and articles wherein the composite material includes a polymeric layer.

BACKGROUND

There has been considerable interest in reducing the weight of vehicles and articles used in transportation. This has resulted in a continued search for new lightweight materials, such as composite materials including a metallic layer and a polymeric polymeric layer. Desirably, such materials may offer one or more benefits such as reduced weight, increased stiffness to weight ratio, reduced cost, and the like.

For many applications, it is also desirable for such composite materials to be weldable (i.e., capable of being welded using electrical resistance welding). It has been generally recognized that sandwich composite materials including an insulating polymeric layer are difficult to weld, making them unsuitable for such applications. Attempts to improve the weldability of the composite material have included the addition of conductive fillers in a powder form to the polymeric layer so that the electrical conductivity of the polymeric layer is increased. To compensate for the poor conductivity of the polymer, relatively high levels of conductive powders have been thought necessary. Composite materials including a conductive powder unfortunately have generally poor mechanical properties and generally poor drawability.

Additionally, such material generally requires special equipment for processing (e.g., fabricating, welding, stamping, drawing, and the like). Additionally, it is desirable for a material to have improved weldability, such as may be characterized by a generally high weld current range, by the capability of being welded to a broad range of substrates (preferably using some or all of the same weld parameters), or both.

There continues to be a need for a material that overcomes one or more, or even all of the above. For example, there continues to be a need for a composite material having light weight, increased stiffness to weight ratio, reduced cost, improved weldability, good mechanical properties, good drawability, capable of being processed using existing infrastructure; or any combination thereof.

For welding certain structures, such as thicker section composite materials, articles requiring closely spaced welds, and the like, there may be additional difficulties with welding the composite material. As such, there also has continued to be a need for new welding processes for welding thicker section composite material.

SUMMARY OF THE INVENTION

Figure 1:
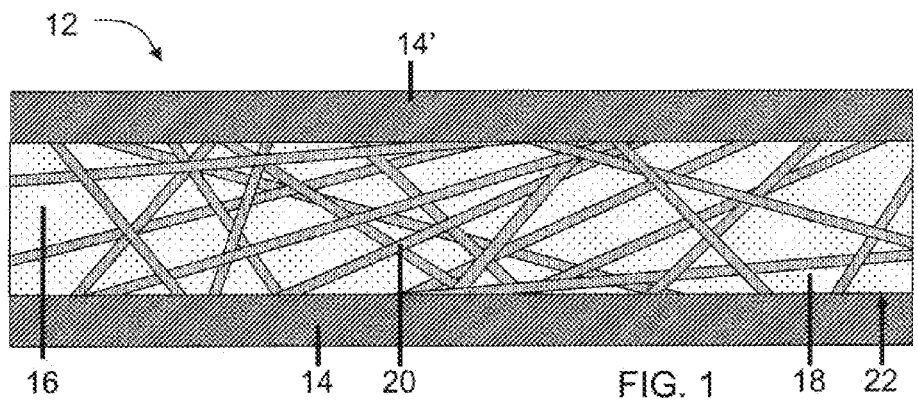
FIG. 1 is a cross-section of an illustrative composite material that may be used according to the teachings herein.

Unexpectedly, despite the generally low electrical conductivity of the polymer in the composite materials, the present teachings achieve excellent results in welding button size, a large processing window for welding or both, using a process including a step of contacting a substrate material with a composite material, wherein the composite material includes a pair of spaced apart steel sheets and a core layer between the sheets; the volume of the core layer is about 25 volume % or more, based on the total volume of the composite material; the core layer includes a plurality of metallic fibers (e.g., steel fibers) arranged in one or more masses of fibers that extend the thickness of the core layer so that the core layer is in electrical communication with the steel sheets; and the metallic fibers have a cross sectional area perpendicular to the length of the fibers from about $1 \times 10^{-5}$ mm$^2$ to about $2.5 \times 10^{-2}$ mm$^2$.

Accordingly, in aspects of the invention, there is contemplated a welding process that includes configuring a sandwich composite material in a particular manner such that the sandwich composite material can be employed as a "substitute material" for conventional steel, such as used in automotive body parts. The process can be performed absent of modifications to the techniques and equipment as would be expected to take into account the selection of materials for the composite.

In one aspect of the invention, welding of the composite material to a substrate is unexpectedly achieved using a novel welding process including a plurality of welding stages. Though having other applications too, such a welding process may be particularly useful for welding composite material having a generally high thickness (e.g., a thickness of about 1.5 mm or more), for forming a shunted weld (e.g., a weld located in close proximity to a previously formed weld, such as a weld separated by a distance of about 150 mm or less, or both.

DETAILED DESCRIPTION

In attempting to resistance weld a composite material that has a metallic layer and a polymeric layer (e.g., a polymeric layer that includes a polymer such as a thermoplastic), difficulties (e.g., a low weld strength, metal expulsion during welding, a loud popping noise during welding, weld sparks, and the like) may arise from the difference in electrical properties between the polymeric layer and the metallic layer, the substrate to which it is to be welded, or both. It has unexpectedly been discovered that some or all of these difficulties in welding a composite material may be reduced or eliminated by i) configuring materials for providing a composite material that includes a pair of spaced apart steel sheets and a core layer between the sheets, wherein the volume of the core layer is about 25 volume % or more, based on the total volume of the composite material, the core layer includes a plurality of metallic fibers, and the metallic fibers have a cross sectional area perpendicular to the length of the fibers from about $1\times10^{-5}$ mm$^2$ to about $2.5\times10^{-2}$ mm$^2$; ii) using a multi-stage welding process that includes a first weld stage that employs a first or initial processing condition and a subsequent second weld stage that employs a second processing condition that is different from the first processing condition; or both i) and ii).

Surprisingly, composite materials including a pair of spaced apart steel sheets and a core layer between the sheets, wherein the volume of the core layer is about 25 volume % or more, based on the total volume of the composite material, the core layer includes a plurality of metallic fibers, and the metallic fibers have a cross sectional area perpendicular to the length of the fibers from about $1\times10^{-5}$ mm$^2$ to about $2.5\times10^{-2}$ mm$^2$ will have improved weldability, such as under weld conditions typically employed for welding low carbon steel. The improved weldability may be characterized by a generally high weld current range (i.e., the difference between the upper limit of the weld current above which expulsion occurs and the lower limit of the weld current below which the weld button size is too low). The composite materials of the present invention may have a generally high bulk resistivity, a generally high static contact resistance (i.e., SCR) (e.g., greater than the SCR of a monolithic steel of the same metal, having the same surface roughness, and the same surface treatment), or both. The high bulk resistivity and/or the high SCR may result in an unexpectedly high weld current range. It is believed that other approaches that increase the SCR, such as changes to a surface feature (e.g., increasing surface roughness), may have limited effect on the weld current range, because such surface feature causing the increased SCR may be eliminated early in the welding process. In contrast, the high SCR of the composite materials of the present invention may be related to the bulk features of the composite material, including the contacts between the metallic fibers in the core layer and the metallic sheets, as well as the contacts between different metallic fibers in the core layer. Without being bound by theory, it is believed that the high SCR caused by the bulk features of the present invention are less transient (e.g., compared to those caused by surface features) and result in unexpectedly high weld current ranges. Furthermore, without being bound by theory, it is believed that generally modest increases in the SCR of the composite material may result in the largest weld current range. It is also found that when the SCR is too high, a weld controller may fail to pass current through the core layer during a welding process. As such, the SCR should be sufficiently low so that the composite material is capable of being welded with weld controllers typically used in welding automotive body parts.

Welding of a weld stack including the composite material and a substrate may be performed using a resistance welding apparatus including at least two electrodes. The electrodes may be used for providing a current to the weld stack, for providing a force to the weld stack, or both.

A multi-stage welding process including a first weld stage and a second weld stage may advantageously be employed with a composite material, such as a composite material described herein. A multi-stage welding process may be particularly useful when welding a composite material having a generally high thickness (e.g., about 1.5 mm or more, about 2.0 mm or more, or about 2.5 mm or more), when welding a shunted weld (e.g., a weld that is separated by another weld by a distance of about 200 mm or less, about 150 mm or less, about 100 mm or less, or about 50 mm or less), or both. During the first weld stage, the process may include a step of inducing at least some of the polymer (e.g., the polymer in a region to be welded) to undergo a first order or a second order phase transition so that it is in a liquid state above its glass transition temperature. When the polymer is in a liquid state above its glass transition temperature, at least some of the polymer may be removed from the region to be welded (e.g., by a compressive force applied by the weld electrodes), the electrical properties of the remaining composite material (e.g., the remaining polymeric layer) may change, or both. Furthermore, during the second weld stage, the process may include a step that processes the material so that at least some of the metal of the metallic layer melts and the metallic layer of the composite material may fuse to a second substrate (e.g., a metallic layer of a second composite material, or a monolithic metallic material).

In various aspects of the invention, the initial processing condition for the first weld stage and the second processing condition for the second weld stage may be predetermined, such as by the properties of the materials to be welded (e.g., the compositions of the materials, the thicknesses of the materials, the optional coatings on the materials, or any combination thereof), or by one or more test welds. In other aspects of the invention, the initial processing condition of the first weld stage may be predetermined as discussed above, and the processing condition of the second weld stage may be determined by a process including one or any combination of the following steps: monitoring one or more preselected conditions; comparing information about the preselected condition with a predetermined desired value; or automatically setting the second processing condition (e.g., altering the first processing condition) based on the information, such as information from the comparing step. In yet other aspects of the invention, the first processing condition may be determined by a measuring or monitoring step. As such, the welding process may include a step of measuring or monitoring one or more predetermined conditions; a step of comparing information about the preselected condition with a predetermined value; and a step of setting (e.g., automatically setting) the first processing conditions based on the information, such as the information from a comparing step; and a step of setting (e.g., automatically setting) the second processing condition. For example, the welding method may include an initial processing condition which includes one or more conditions that are predetermined (e.g., the weld pressure, the weld current, the weld voltage, and the like), and one or more conditions that are not predetermined (e.g., the weld time, or the number of weld cycles). As such, the method may include a step of monitoring one or more preselected conditions, comparing information about the preselected condition, and automatically setting the weld time or the number of weld cycles based on the information from the comparing step.

It will be appreciated that the steps of monitoring a preselected condition, comparing the information about the preselected condition with a predetermined desired value, or both, may occur before the first weld stage, during the first weld stage, after the first weld stage, or any combination thereof.

An example of a composite material having a sandwich structure 12 including a first metallic layer 14, a second metallic layer 14' and a polymeric layer 16 (e.g., a polymeric core layer) interposed between the first and second metallic layers, is illustrated in FIG. 1. Referring to FIG. 1, the polymeric layer 16 may include a polymer phase 18 containing one or more polymers (e.g., thermoplastic polymer) 18 and a filler phase 20 containing one or more fillers. The polymeric layer 16 and the first metallic layer 14 may have a common surface 22. The filler illustrated in FIG. 1 are shown as fibers, however other fillers may be used in lieu of, or in addition to the fibers, (e.g., particulates, performs, or other). As illustrated in FIG. 1 some or all of the fillers (e.g., the fibers) may have a length and orientation such that they extend from one surface of the polymeric layer to the opposing surface of the polymeric layer for contacting the sandwiching metal on both sides of the polymeric layer. Fibers may be entangled so that a resulting entangled mass extends across the entire polymeric layer. However, it will be appreciated that other filler (e.g., fiber) lengths and orientations are within the scope of the inventions. For example, the fraction of the fillers (e.g., fibers) that extend between the two opposing faces of the polymeric layer may be less than 50%, less than 30%, less than 20%, less than 10%, less than 5%, or less than 1%.

The weld formed by the process described herein includes at least one composite material. The materials that comprise the weld (prior to welding) are referred to as the weld stack. The weld stack may include a composite material welded to itself, a first composite material welded to a second composite material that may be the same or different from the first composite material, or a first composite material and a substrate that is not a composite material having a polymeric layer (such as a metal or a metal alloy). It will be appreciated that the weld stack may further comprise one or more additional substrates that may be composite materials, metallic materials, or both. Without limitation, the weld stack may include, consist essentially of, or consist of i) two composite materials; ii) a composite material and a metallic material; iii) a composite material and two or more metallic materials; or iv) two or more composite materials and one or more metallic materials. If the weld stack includes at least two metallic materials, the two metallic materials may be on the outside of the weld stack (i.e., the composite material may be interposed between the two metallic materials in the region to be welded), or the composite material may be at the top or bottom of the weld stack.

The composite material and the substrate to be welded together may each independently have a thickness of about 0.1 mm or more, preferably about 0.2 mm or more, more preferably about 0.4 mm or more, and most preferably about 0.6 mm or more (e.g., 0.7 mm or more). The composite material and the substrate to be welded together may each independently have a thickness of about 20 mm or less, preferably about 10 mm or less, more preferably about 5 mm or less, even more preferably about 2.1 mm or less, even more preferably about 1.8 mm or less, and most preferably about 1.3 mm or less. The use of composite materials and substrates having higher and lower thicknesses are also within the scope of the present invention.

The total thickness of the weld stack including the composite material (e.g., the combined thickness of the composite material and the substrate) may be about 0.8 mm or more, preferably about 1.0 mm or more, and more preferably about 1.2 mm or more. The total thickness of the weld stack (e.g., the combined thickness of the composite material and the substrate) may be about 30 mm or less, preferably about 15 mm or less, more preferably about 8 mm or less, even more preferably about 4 mm or less, and most preferably about 3 mm or less. The use of a weld stack having higher or lower total thicknesses are also within the scope of the present invention. According to the teachings herein, a special welding process, such as a multi-stage welding process, may be advantageously employed when the total stack thickness is large, such as when the total stack thickness is about 2.0 mm or more, about 2.4 mm or more, about 2.8 mm or more, or about 3.2 mm or more.

Composite Material

In general, the composite materials herein include a filled polymeric material that includes a filler phase distributed in a polymeric matrix. In general, the composite materials herein employ at least two layers, one of which is the above filled polymeric material. More particularly, the materials herein are composites that include a sandwich structure, pursuant to which a filled polymeric layer (e.g., a polymeric core layer) is sandwiched between two or more other layers. The composite materials may also be a laminate including a first metallic layer upon which a filled polymeric layer is attached so that the filled polymeric layer has an exposed outer surface. Composites with a metallic layer sandwiched between two polymeric layers are also contemplated.

Without limitation, examples of composite materials that may be employed in the welding process include the filled polymeric materials (e.g., the filled polymeric layers) and the composite materials described in International Patent Application No. PCT/US09/53676 (filed on Aug. 13, 2009 by Mizrahi), incorporated herein by reference in its entirety.

Static Contact Resistance

The composite materials of the present invention preferably have a static contact resistance sufficiently (i.e., SCR) low so that composite material is capable of passing the weld current through the composite material (e.g., using conventional welding equipment). The composite materials of the present invention preferably have a SCR sufficiently high so that the processing window for welding is increased, so that the current needed for welding is decreased, or both. In particular, the composite materials preferably have a SCR that is greater than the SCR of a monolithic metal sheet having the same thickness as the composite material and made from the same metal as the metallic sheet of the composite material.

Test Method for Measuring Static Contact Resistance

SCR may be measured for a single material, or for a stack of two or more materials. SCR and its measurement is described in "The Effect of Electrical Resistance on Nugget Formation During Spot Welding", J. G. Kaiser, G. J. Dunn, and T. W. Eagar, Welding Research Supplement, June, 1982, pages 167-s to 174-s, incorporated herein by reference in its entirety. It will be appreciated that for a monolithic material having high electrical conductivity, the contact resistance may be controlled by surface features, such as roughness of the surface, a surface layer (e.g., an oxide layer or an oil layer on the surface), and the like. In addition to the aforementioned surface features, the SCR of the composite material may be influenced by the bulk resistivity of the polymeric layer (i.e., the core layer of the composite material).

The SCR of a material or a stack of two materials may be measured by placing the material or the stack of materials between two class I-RWNA electrodes having a face diameter of about 4.8 mm. Unless otherwise specified, the SCR may be measured using a force of about 2220 Nt (about 500 lb) applied by the electrodes. During the SCR measurement, the resistance may be measured for about 45 seconds, beginning with the time the load is applied to the electrodes. The SCR may be determined by the average resistance of the material or the stack of materials for the 5 seconds following the time at which the resistance is stable. A stable SCR may be determined by a resistance change of less than 2% per second, less than 1% per second, or less than 0.5% per second. It will be appreciated that high pressures can be used for measuring the SCR of materials thicker than about 1.2 mm. The SCR of the material may be measured using a 25 mm×25 mm coupon of the material.

The SCR ratio of a composite material may be determined by measuring the SCR of the composite material and dividing it by the SCR of a monolithic metal sheet having the same thickness as the composite material, made from the same metal as the metallic sheet of the composite material, and having the same surface characteristics (e.g., surface roughness, surface treatment, and the like) as the composite material. The SCR ratio of the composite material may be about 1 or more, preferably about 1.2 or more, more preferably about 1.5 or more, even more preferably about 2 or more, even more preferably about 3 or more, even more preferably about 4 or more, even more preferably about 5 or more, and most preferably about 10 or more. The SCR ratio of the composite material may be about 1000 or less, preferably about 300 or less, more preferably about 100 or less, even more preferably about 75 or less, even more preferably about 40 or less, and most preferably about 30 or less. Without being bound by theory, it is believed that having a SCR ratio greater than 1 is useful for achieving a robust weld processing window (e.g., a weld processing window characterized by a high weld current range, such as a weld current range of about 1 kA or more, about 1.5 kA or more, about 2 kA or more, or about 2.5 kA or more).

It will be appreciated that if the SCR of the composite material is too high, the composite may have difficulty in passing a current and thus not be easily welded. The SCR of the composite material preferably is about 0.0020Ω or less, more preferably about 0.0017Ω or less, even more preferably about 0.0015Ω or less, even more preferably about 0.0012Ω or less, and most preferably about 0.0008Ω or less.

The ratio of the SCR of the composite material to the SCR of the substrate to which it is being welded (e.g., cold rolled steel, galvanized steel, galvannealed steel, or any combination thereof) preferably is about 1 or more, more preferably about 1.2 or more, even more preferably about 1.5 or more, even more preferably about 2 or more, even more preferably about 3 or more, even more preferably about 4 or more, even more preferably about 5 or more and most preferably about 10 or more. The ratio of the SCR of the composite material to the SCR of the substrate to which it is being welded preferably is about 1000 or less, more preferably about 300 or less, even more preferably about 100 or less, even more preferably about 75 or less, and most preferably about 40 or less.

Filled Polymeric Material

As described above, the filled polymeric material includes a polymer and a filler. The filled polymeric material preferably has a relatively low density (preferably at least 10% less than the density of the metallic material). The filled polymeric material preferably includes polymers, fillers, or both that have relatively low electrical resistivity, so that the electrical resistivity of the polymeric material is relatively low. For example, the filled polymeric material may include a polymer having a relatively high electrical resistivity and a filler that has a relatively low electrical resistivity, so that when combined to form the filled polymeric material, the mixture has a relatively low electrical resistivity compared the electrical resistivity of the polymer. The electrical resistivity (in the through-thickness direction) of the composite material, the filled polymeric material, or both may be about 100,000 Ω·cm or less. Preferably, the composite material has an electrical resistivity sufficiently low so that the composite material is capable of being welded to a substrate of a monolithic sheet of steel by a resistance welding technique that uses a welding schedule that is generally the same as the welding schedule for welding two monolithic sheets of steel of the same thicknesses as the composite material and the substrate. For example, the electrical resistivity of the filled polymeric material, the composite material, or both, in the through thickness direction, preferably is about 100 Ω·cm or less, about 10 Ω·cm or less, about 1 Ω·cm, about 0.15 Ω·cm or less, about 0.1 Ω·cm or less, or about 0.075 Ω·cm or less.

The concentration of the filled polymeric material may be about 20 volume % or more, preferably about 25 volume % or more, more preferably about 30 volume % or more, even more preferably about 40 volume % or more, and most preferably about 50 volume % or more, based on the total volume of the composite material. The concentration of the filled polymeric material may be about 95 volume % or less, more preferably about 90 volume % or less, even more preferably about 85% or less, and most preferably about 75 volume % or less, based on the total volume of the composite material. It will be appreciated that the filled polymeric material and the metallic layers may each have generally uniform thicknesses, so that the volume % of the filled polymeric material and the thickness % of the filled polymeric material are equivalent.

The filled polymeric material may fill some or all of the space between two metallic layers (e.g., two metallic faces, such as in a sandwich structure). For example, the concentration of the filled polymeric material may be at least about 30 volume %, preferably at least about 50 volume more preferably at least about 70 volume %, even more preferably at least about 90 volume %, and most preferably at least about 95 volume % (if not about 100 volume %) of the volume between two metal layers (e.g. the two metallic faces).

The material of any core in the sandwich composites herein may contain pores or voids, or may be substantially free of pores and voids. Preferably, the concentration of pores and voids in the filled polymeric material is less than about 25 volume %, more preferably less than about 10 volume %, still more preferably less than about 5 volume %, and most preferably less than about 2 volume % (e.g., less than about 1% by volume), based on the total volume of the filled polymeric material.

Polymers

The polymeric material of the composite material may include a thermoplastic polymer, an elastomeric polymer, or any combination thereof. Preferred the polymer includes or consists substantially entirely of one or more thermoplastic polymers. The polymer may include a homopolymer, a copolymer (e.g., a block copolymer, a random copolymer, a graft copolymer, an alternating copolymer, or otherwise), or any combination thereof. One or more thermoset polymers may be used in the in the polymeric material.

Thermoplastic polymers that may be employed preferably have at least one solid to liquid phase transition (e.g., a first order phase transition, such as a melting temperature, a second order phase transition, such as a glass transition temperature, or both) greater than about 25° C., so that the thermoplastic polymer is a solid and/or has a relatively high viscosity at ambient conditions and is a liquid and/or has a relatively low viscosity when heated. For example, the thermoplastic polymer may have a melting temperature or glass transition temperature that is about 40° C. or more, about 60° C. or more, about 80° C. or more, or about 100° C. or more. Melting temperatures (e.g., peak melting temperatures), glass transition temperatures, or both may be measured according to ASTM D3418-08.

Without limitation, polymers that may be employed include a polyolefin, a polyamide, a polyester, a polyether, a polystyrene, a polymer including an acrylonitrile, an acrylic acid, or an acrylate, a polyimide, polycarbonates, an ionomer, a copolymer including any or more of the above polymers, and blends including one or more of the above polymers or copolymers. Additional examples polymers that that may be employed in the filled polymeric material include polymers described in paragraphs 0052 through 0063 of International Patent Application Publication No. WO/2010/021899 (filed on Aug. 13, 2009) and paragraphs 0060 through 0086 of U.S. Provisional Application No. 61/387,174 (filed on Sep. 28, 2010).

Particularly preferred polymers include polyethylene, polyethylene copolymers (preferably including about 70 wt. % ethylene or more), polypropylenes, polypropylene copolymers, polyamides, and copolyamides. Examples of polyethylenes and polyethylene copolymers that may be employed include low density polyethylene, linear low density polyethylene, medium density polyethylene, and polyethylene plastomers. Examples, of polypropylenes that may be employed include polypropylene homopolymer (e.g., isotactic polypropylene homopolymer), impact polypropylene (e.g., polypropylene including isotactic polypropylene and a rubber phase), and random polypropylene copolymers.

Exemplary polyolefins that may be mixed with an ionomer include homopolymers and copolymers including about 50 wt. % or more of an α-olefin having about 2 to about 10 carbons. Preferred polyolefins for mixing with an ionomer include those having about 50 wt. % or more of ethylene, propylene, butane, or hexane. More preferred polyolefins for mixing with an ionomer include those having about 50 wt. % or more of ethylene, or propylene. The concentration of the α-olefin (e.g., the concentration of the ethylene or propylene) in the polyolefin preferably is about 60 wt. % or more, more preferably about 70 wt. % or more, even more preferably about 80 wt. % or more, and most preferably about 90 wt. % or more, based on the total weight of the polyolefin. Preferred polyolefins include polyolefins consisting essentially of one or more α-olefins. For example, the concentration of the one or more α-olefins may be about 90 wt. % or more, about 95 wt. % or more, about 98 wt. % or more, about 99 wt. % or more, or about 99.9.

wt. % or more, based on the total weight of the polyolefin. Without limitation, the polyolefin used in a blend with an ionomer may include or consist essentially of high density polyethylene (e.g., having a density of about 0.945 to about 0.990 g/c$m^3$), low density polyethylene, linear low density polyethylene (e.g., a copolymer having a density of about 0.915 to about 0.930 g/cm$^3$), medium density polyethylene (e.g., a copolymer having a density of about 0.930 to about 0.945 g/cm$^3$), very low density polyethylene (e.g., having a density of about 0.900 to about 0.915 g/cm$^3$), polyethylene plastomers (e.g., a copolymer having a density of about 0.860 to about 0.900 g/cm$^3$, preferably from about 0.870 to about 0.895 g/cm$^3$), isotactic polypropylene homopolymer, isotactic polypropylene copolymers having a crystallinity of about 5 wt. % or more, impact polypropylene, polypropylene block copolymers including one or more blocks of isotactic polypropylene, mixtures thereof, or any combination thereof. Examples of other polyolefins suitable for blending with an ionomer are copolymers including or consisting essentially of i) about 60 wt. % or more of an α-olefin; and ii) one or more monomers selected from the group consisting of vinyl acetate, methyl acrylate, butyl acrylate, acrylic acid, methyl methacrylate, methacrylic acid, and any combination thereof. The mixture of an ionomer and a polyolefin may include a sufficient amount of the ionomer so that the polymer adheres to the metal layers, to the metallic fiber, or both. The weight ratio of the ionomer to the polyolefin may be about 1:99 or more, about 3:97 or more, about 5:95 or more, about 10:90 or more, or about 20:80 or more. The weight ratio of the ionomer to the polyolefin may be about 99:1 or less, about 90:10 or less, about 70:30 or less, about 50:50 or less, or about 40:60 or less.

In one particularly preferred aspect of the invention the filled polymeric material includes a one or more polyamide copolymers, one or more thermoplastic polyurethanes, one or more thermoplastic polyether-ester copolymers, one or more ionomers, or any combination thereof. The polyamide copolymer may be any of the polyamide copolymers described above herein. Preferred polyamide copolymers include polyamide-polyamide copolymers, polyesteramide copolymers, polyetheresteramides, polycarbonate-esteramide copolymers, or any combination thereof. Any of the thermoplastics may be a random copolymer or a block copolymer. Any of the thermoplastics may be a thermoplastic elastomer. By way of example, the filled polymeric material may include a polyester amide thermoplastic elastomer, a polyetheresteramide thermoplastic elastomer, a polycarbonate-esteramide thermoplastic elastomer, a polyether-ester thermoplastic elastomer, a amide block copolymer thermoplastic elastomer, or any combination thereof. The filled polymeric material may optionally include one or more polymers that is not a copolymer. For example filled polymeric material may include one or more polyamide homopolymer. Particularly preferred polyamide homopolymers include polyamide 6 and polyamide 6,6. If employed the concentration of the one or more polyamide homopolymers preferably is relatively low (e.g., compared with the concentration of the one or more copolymers. If present, the concentration of the one or more polyamide homopolymers preferably is about 50 weight percent or less, more preferably about 40 weight percent or less, even more preferably about 30 weight percent or less, and most preferably about 25 weight percent or less, based on the total weight of the polymer in the filled polymeric material.

A particularly preferred copolyamide that may be used is a copolyamide including from about 30 wt. % to about 70 wt. % (e.g., about 50 wt. %) polyamide 6 and from about 30 wt. % to about 70 wt. % (e.g., about 50 wt. %) polyamide 6,9. Such copolyamide may be characterized by one or more of the following: an elastic modulus from about 100 MPa to about 600 MPa (e.g., about 300 MPa) measured according to ISO 527-2, a melting point from about 100° C. to about 165° C. (e.g., about 130° C.) as measured according to ISO 11357, and an elongation at break from about 400% to about 2000% (e.g., about 900%) measured according to ISO 527-3).

The thermoplastic polymers are preferably relatively long chain polymers, such that they may have a number average molecular weight greater than about 20,000, preferably greater than about 60,000, and most preferably greater than about 140,000. They may be unplasticized, plasticized, elastomer modified, or free of elastomer. Semi-crystalline polymers may have a degree of crystallinity greater than about 10 wt %, more preferably greater than about 20 wt %, more preferably greater than about 35 wt %, more preferably greater than about 45 wt %, and most preferably greater than about 55 wt %. Semi-crystalline polymers may have a degree of crystallinity less than about 90 wt %, preferably less than about 85 wt %, more preferably less than about 80 wt %, and most preferably less than about 68 wt %. Crystallinity of the thermoplastic polymer may be measured using differential scanning calorimetry by measuring the heat of fusion and comparing it to art known heat of fusion for the specific polymer, such as described in ASTM D3418.

The polymer of the filled polymeric material may also contain up to about 10 wt % of a grafted polymer (e.g., a grafted polyolefin such as isotactic polypropylene homopolymer or copolymer, or a polyethylene homopolymer or copolymer) which is grafted with a polar molecule, such as maleic anhydride. The concentration of the grafted compound may be about 0.01 wt. % or more based on the total weight of the grafted polymer. Particularly preferred grafted polymers include from about 0.1 wt. % to about 3 wt. % maleic anhydride.

Fillers

The filled polymeric material may contain one or more fillers, and preferably includes one or more conductive fillers. Any amount of filler may be employed in the filled polymeric material. Preferably, the concentration of the filler is sufficiently high so that the filled polymeric material, the composite material, or both, have a relatively low electrical resistivity (e.g., compared with the electrical resistivity of the polymer). The concentration of the filler may be about 3 volume % or more, preferably about 5 volume % or more, more preferably about 8 volume % or more, even more preferably about 10 volume % or more, and most preferably about 12 volume % or more, based on the total volume of the filled polymeric material. Low filler concentrations are preferred, so that the density of the filled polymeric material is relatively low (e.g., compared with the density of the filler, the metallic sheets, or both). As such, the concentration of the filler may be about 50 volume % or less, preferably about 35 volume % or less, more preferably about 30 volume % or less, even more preferably about 25 volume % or less, even more preferably about 23 volume % or less, and most preferably about 21 volume % or less, based on the total volume of the filled polymeric composition.

The filler may have any shape. For example, the filler may have a generally spherical shape, a generally fiber shape (such as a shape having one dimension at least 5 times greater than the other two dimension), or a generally planar shape (such as a shape having two dimensions at least 5 times greater than the smallest dimension). As used herein, filler fibers refer to fillers having a generally fiber shape, whereas filler particles refer to other filler shapes (such as generally planar shapes and generally spherical shapes).

Without limitation, examples of fillers which may be employed in the filled polymeric material include fillers described in paragraphs 0064 through 0081 of International Patent Application No. PCT/US09/53676 (filed on Aug. 13, 2009 by Mizrahi), and paragraphs 0087 to 0114 of U.S. Provisional Application No. 61/387,174 (filed on Sep. 28, 2010).

Examples of suitable fillers include, metallic fibers, metallic particles, carbon black, graphite, iron phosphide, and any combination thereof. Preferably the filler includes or consists substantially (e.g., at least 80% by volume, at least 90% by volume, or at least 95% by volume, based on the total volume of filler) of particles, fibers, or both that are conductive (e.g., having a resistivity of about $10^{-4}$ Ωcm or less). More preferably, the filler includes or consists substantially of metallic particles, metallic fibers, or both. Most preferably, the filler includes or consists substantially of metallic fibers.

The metallic fibers may have a melting or liquidus temperature sufficiently low so that during a step of welding (such as electrical resistance spot welding), some or all of the metallic fibers in the region between the weld electrodes (i.e., weld tips) at least partially melt (e.g., entirely melt) before one or both of the metallic layers melt. The electrical resistivity of the filled polymeric material may be higher (e.g., by a factor of about 2 or more, about 10 or more, or about 100 or more) than the electrical resistivity of the metal layer, so that the metallic fibers begin to melt before the metal layer begins to melt. The welding process may employ a step of sufficiently cooling the weld electrodes so that the metallic fibers melt before the metal layer begins to melt. As such, the metallic fibers may include, consist essentially of, or consist of a metal (e.g., steel) having a melting temperature or liquidus temperature less than, the same as, or even greater than the metal (e.g., steel) in the first metallic layer, the second metallic layer, or both.

In one embodiment of the invention the metallic fibers preferably have one or more generally flat surfaces, such as a generally flat surface in the longitudinal direction of the fiber. A flat surface may extend along some or all of the length of the fiber. The cross-section of a metallic fiber, in the transverse direction of the fiber (i.e., perpendicular to the length of the fiber), may have one or more generally straight sides. For example, the cross-section of a metallic fiber in the transverse direction may have four or more generally straight sides, two or more parallel sides, or both. Without limitation, the metallic fiber may have a cross-section that is generally rectangular, generally a parallelogram, generally a polygonal having four or more sides, or generally a square. Other profiles, may have just one flat surface, such as a semicircular cross-section. The cross-section of the metallic fiber in the transverse direction may be characterized by a thickness (e.g., the thinnest dimension) and a width (i.e., the direction perpendicular to the thickness). The ratio of the width to the thickness of the fibers may be about 1 or more, about 2 or more, about 3 or more, or about 4 or more. The ratio of the width to the thickness of the fibers preferably is about 60 or less and more preferably about 30 or less (e.g., about 20 or less, or about 15 or less).

Unexpectedly, composite materials and filled polymeric materials including metallic fibers having at least one generally flat surface in the longitudinal direction (e.g., having a rectangular cross-sectional profile in the transverse direction) have higher electrical conductivity compared with materials made with an equivalent volume of metallic fibers of the same metal and having a generally cylindrical shape. For example, the ratio of the electrical conductivity of a filled polymeric material including a concentration of metallic fibers having a generally flat longitudinal surface to an identical filled polymeric material except the metallic fibers are replaced the same concentration of metallic fibers that are generally cylindrical may be about 1.1 or more, about 1.5 or more, or about 2.0 or more. Thus it is possible to achieve improved weldability, reduced density, or both, using such fibers.

The weight average length of the metallic fibers preferably is about 200 μm or more, more preferably about 500 μm or more, even more preferably about 800 μm or more, even more preferably about 1.2 mm or more, and most preferably about 1.8 mm or more. It will be appreciated that the metallic fibers may have a weight average length of about 10 mm or more, or even be generally continuous. For applications that require spot welding, the metallic fibers preferably have a weight average length that is less than the diameter of a weld electrode typically used for spot welding, so that the metallic fibers may more easily flow away from the weld zone during a welding process. For example, the metallic fibers may have a weight average length of about 20 mm or less, about 10 mm or less, about 7 mm or less, about 5 mm or less, about 4 mm or less, or about 3 mm or less. The aspect ratio of the fibers may be estimated by dividing the length of the fiber by $(4A_T/\pi)^{1/2}$, where $A_T$ is the cross-sectional area of the fiber in the transverse direction. The aspect ratio of the fiber may be about 5 or more, about 10 or more, about 20 or more, or about 50 or more. The aspect ratio of the fibers may be about 10,000 or less, about 1,000 or less, or about 200 or less. It will be appreciated from the teachings herein that metallic fibers having an aspect ratio greater than 10,000 may be employed.

When used in the polymeric layer between two metallic layers, the metallic fibers preferably are present as a mass of fibers. The mass of metallic fibers may be interconnected. The mass of metallic fibers may be entangled. The mass of fibers may form mechanical interlocks (i.e., two or more fibers may be mechanically interlocked). The mass of metallic fibers preferably spans the thickness of the polymeric layer so that the mass of fibers (e.g., the network of metallic fibers) electrically connects the two metallic layers. The mass of fibers may be used in a welding process that includes flowing electric current between the sheets using the metallic fibers and heating the polymeric layer with resistance heat from the electric current flowing in the fibers. The process may employ inductive heating, conductive heating, or both. A single metallic fiber may span the thickness of the polymeric layer. Preferably at least some of the metallic fibers do not individually span the thickness of the polymeric layer. If metallic fibers span the thickness of the polymeric layer, the fraction of the fibers that span the thickness preferably is about 0.4 or less, more preferably about 0.20 or less, even more preferably about 0.10 or less, even more preferably about 0.04 or less, and most preferably about 0.01 or less. The fibers in the mass of fibers preferably are arranged in a non-ordered arrangement. For example, the maximum number of neighboring metallic fibers that are arranged in a generally aligned arrangement may be less than about 100, preferably less than about 50, more preferably less than about 20, even more preferably less than about 10, and most preferably less than about 5. More preferably the mass of fibers are arranged in a generally random arrangement. Ordered arrangements such as a braided wire arrangement (e.g., including two, three, or more fibers), a twisted filament arrangement, a woven, or a mesh arrangement may be employed.

Preferably, few, if any of the metallic fiber will contact a metallic layer over a large portion of the length of the metallic fiber. For example, a large fraction of the metallic fibers may have a significant portion that is not in contact with the metallic layer. The fraction of the metallic fibers that contact a metallic layer along at least half of the length of the fiber is preferably about 0.3 or less, more preferably about 0.2 or less, even more preferably about 0.1 or less, even more preferably about 0.04 or less, and most preferably about 0.01 or less.

The metallic fibers may have a generally rectangular cross-section in the plane transverse to the longitudinal axis of the fiber (i.e., the fibers may be provided as having a generally ribbon-like shape). Such fibers may be characterized by a weighted average length, a weighted average width, and a weighted average thickness, where the ratio of the width to the thickness is about 1 or more (e.g., about 2 or more, about 3 or more, or about 4 or more), and the ratio of the length to the width is about 5 or more (e.g., about 7 or more, about 10 or more, or about 20 or more). If employed such ribbon shaped fibers preferably have a thickness (e.g., a weighted average thickness) of about 1 μm or more, more preferably about 3 μm or more, even more preferably about 6 μm or more, even more preferably about 10 μm or more, and most preferably about 20 μm or more. The thickness (e.g., a weighted average thickness) of the ribbon shaped fibers preferably is about 100 μm or less, preferably about 80 μm or less, more preferably about 70 μm or less, and most preferably about 60 μm or less. The width (e.g., weighted average width) of the ribbon shaped fibers preferably is about 10 μm or more, more preferably about 20 μm or more, even more preferably about 30 μm or more, and even more preferably about 40 μm or more, and most preferably about 60 μm or more. The width (e.g., weighted average width) of the ribbon shaped fibers preferably is about 400 μm or less, preferably about 200 μm or less, more preferably about 160 μm or less, and most preferably about 140 μm or less. The ribbon shaped fibers preferably include, consist essentially of, or consist of metal fibers, and more preferably include, consist essentially of, or consist of steel fibers. For example, the ribbon shaped fibers may include, consist essentially of, or consist of carbon steel fibers, stainless steel fibers, high strength steel fibers, and the like. Surprisingly, such ribbon shaped fibers are more efficient in improving the electrical conductivity of the composite material compared to generally cylindrical fibers having a smaller cross-sectional area. Thus, the ribbon shaped fibers can be employed in composite materials having an improved weldability, reduced density, or both. Exemplary fibers are fibers prepared by cutting a metallic foil (e.g., having a thickness that is about the thickness of the fibers) into narrow ribbons (e.g., the spacing between cuts may be the width of the fibers). It will be appreciated from the teachings herein that the metallic fibers may be prepared from a monolithic metallic foil, or from a metallic foil having one or more metal layers and/or coatings (e.g., a coating on both large surfaces). Without limitation, the metallic fibers may include a metal or coating that offers galvanic protection. It will be appreciated that ribbon shaped fibers prepared by other means may also be used.

The cross-sectional area of the metallic fibers in the plane transverse to the longitudinal axis preferably is about $1 \times 10^3$ mm² or more, more preferably about $1 \times 10^{-5}$ mm² or more, even more preferably about $8 \times 10^{-5}$ mm² or more, even more preferably about $1 \times 10^{-4}$ mm² or more, and most preferably about $4 \times 10^{-4}$ mm² or more. The cross-sectional area of the metallic fibers in the plane transverse to the longitudinal axis preferably is about $2.5 \times 10^{-2}$ mm² or less, more preferably about $1 \times 10^{-2}$ mm² or less, even more preferably about $2.5 \times 10^{-3}$ mm² or less, and most preferably about $1 \times 10^3$ mm² or less. For example, it is surprising that composite materials employing steel fibers having a cross-sectional area in the plane transverse to the longitudinal axis that are greater than about $8 \times 10^{-5}$ mm² have improved weld process window relative to materials having fibers with lower cross-sectional area. Such composite materials including the fibers having a cross-sectional area greater than about $8 \times 10^{-5}$ mm² maintain the high drawability and formability observed found for the composite materials with thinner fibers.

The metallic fibers may have a substantially constant thickness across the length of the fiber, across the width of the fiber, or both. A flat surface of the fiber may be smooth (i.e., generally free of texture), or may have a texture. For example a ribbon-like fiber may have both major surfaces that are smooth, both major surfaces that are textured, or one major surface that is textured and one major surface that is smooth.

The volume ratio of the polymer to the fibers (e.g., the metallic fibers) is preferably greater than about 2.2:1, more preferably greater than about 2.5:1, and most preferably greater than about 3:1. The volume ratio of the polymer to the fibers (e.g., the metallic fibers) is preferably less than about 99:1, more preferably less than about 33:1, even more preferably less than about 19:1, and most preferably less than about 9:1, (e.g., less than about 7:1).

Figure 2A:
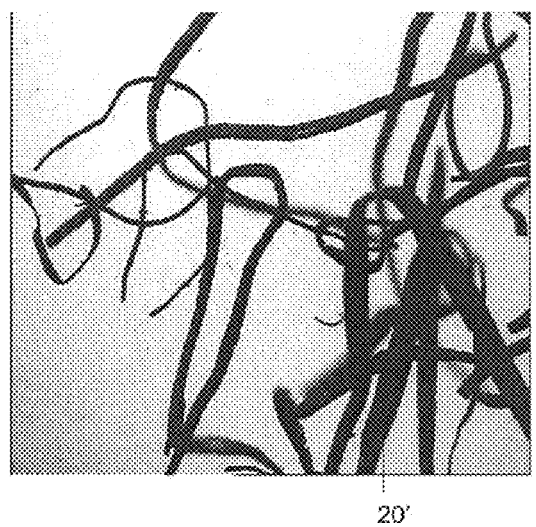
FIG. 2A is a micrograph of illustrative metallic fibers that may be employed in the core layer.
Figure 2B:
FIGS. 2B, 2C, 2D, 2E, 2F, 2G, 2H, 2I, and 2J are cross-sections of illustrative fibers (in the direction transverse to the length of the fibers) having at least one straight side.
Figure 2C:
Figure 2D:
Figure 2E:
Figure 2F:
Figure 2G:
Figure 2H:
Figure 2I:
Figure 2J:

With reference to FIG. 2A, the metallic fibers 20' may have a cross-section in the direction transverse to the long direction that includes one, two or more generally straight sides (such as a generally rectangular cross-section). The length of the metallic fibers may have regions that are generally straight, regions that are generally arcuate, or both. The metallic fibers may be sufficiently long, have sufficient curvature (e.g., along the length of the fibers), be present in sufficient quantity or any combination thereof, so that an entangled mass of fibers is formed.

Illustrative cross-sections (transverse to the length of the fibers) having one or more straight sides that may be employed in the metallic fibers are shown in FIGS. 2B, 2C, 2D, 2E, 2F, 2G, 2H, 2I, and 2J.

Figure 3:
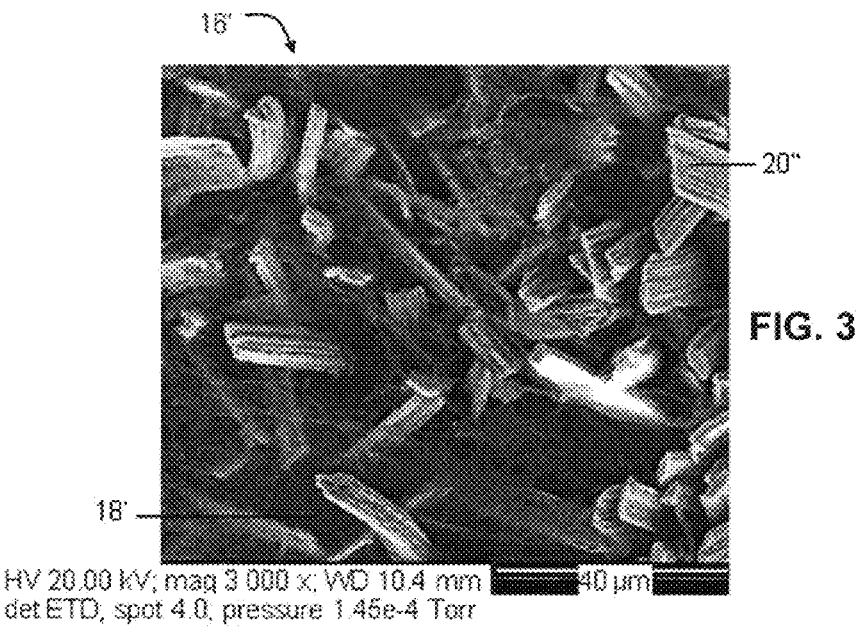
FIG. 3 is a micrograph of an illustrative core layer including metallic fibers and a polymer.

FIG. 3 is an illustrative micrograph of a section of a core layer 16' including metallic fibers 20" and a polymer 18'. As illustrated in FIG. 3, fibers may sufficiently overlap so that an electrical current can be transferred through the core layer. For example, the electrical conductivity of the core layer may be sufficient so that the composite material can be welded using electrical resistance welding.

Figure 4:
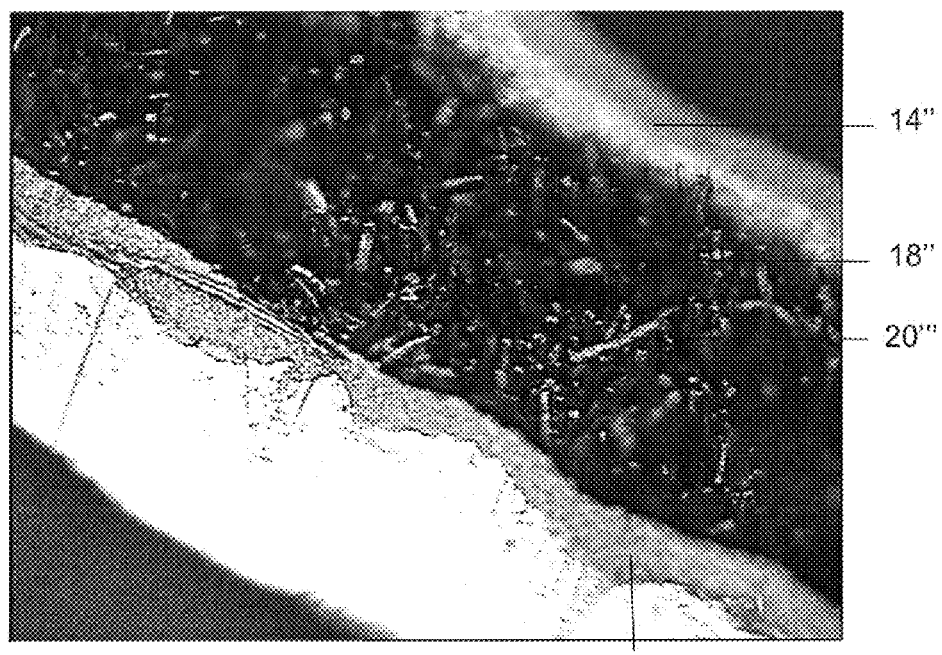
FIG. 4 is a micrograph of an illustrative lightweight composite including two metal layers, metallic fibers, and a polymer.

FIG. 4 illustrates an edge of an illustrative composite material including metallic fibers 20' having a generally rectangular cross-section in the direction transverse to the long direction of the fibers. The core layer includes an entangled mass of metallic fibers 20' and a polymer 18' sandwiched between two metallic layers 14".

The metallic fibers preferably are selected so that the composite material has a generally large process window for welding operations (e.g., a weld current range of about 1 kA or more). For example, the concentration of the metallic fibers, the size of the metallic fibers, the amount of contact between the metallic fibers, the shape of the metallic fibers, the amount of contact between a metallic fiber and the metal layers, or any combination thereof may be selected so that the composite material has a generally large process window for welding operations, a generally high electrical conductivity, a generally high SCR, or any combination thereof. A generally large processing window for welding (i.e., weld process window) may be characterized for example by a high weld current range (measured at fixed weld time), a high weld time range (measured at fixed current), or both.

Metallic Layer

As described above, the composite material includes one, two, or more metallic layers (e.g., metal sheets). For example, the composite material may include two metallic layers (e.g., two face layers) that sandwich the polymeric layer. The metallic layer is preferably formed of a metal or metal alloy that is weldable (e.g., capable of being welded with an electrical resistance welding process). For example, the metallic layer may include or consist of one or any combination of metallic materials described hereinafter. It will be appreciated that the composite material may have a first metallic layer that is relatively easy to weld and a second metallic layer that is relatively difficult to weld (e.g., the second metallic layer may incapable of being welded, or may require a longer weld time, a higher weld current, a higher weld pressure, or any combination thereof compared to the welding of the first metallic layer). For example, the composite material may include one or more metallic layers that has a coated surface (such as a coating that improves the appearance, durability, or adhesion characteristics of the surface).

Without limitation, examples of metallic layers which may be employed in the composite material include metallic layers and metallic materials described in International Patent Application No. PCT/US09/53676 (filed on Aug. 13, 2009 by Mizrahi), and particularly those described in paragraphs 0082 through 0084.

The total thickness of the metallic layers (e.g. the total thickness of the two steel sheets) may be sufficiently thin so that the composite material has a generally low density (e.g., a density reduction of about 5% or more, about 10% or more, or about 15% or more, relative to the density of the steel sheets). For example the thickness fraction, volume fraction, or both, of the metallic layers may be about 75% or less, about 70% or less, about 65% or less, about 60% or lass, or about 55% or less, based on the total thickness of the composite material. The thickness fraction, volume fraction, or both, of the metallic layers may be about 5% or more. The total thickness of the metallic layers may be about 0.1 mm or more, about 0.2 mm or more, or about 0.3 mm or more. The total thickness of the metallic layers may be about 1.5 mm or less, about 1.2 mm or less, about 1.0 mm or less, about 0.8 mm or less, or about 0.6 mm or less.

Metallic Material

As discussed above, the welding method (e.g., the substrates of the weld stack may include one or more metallic materials. Metallic materials that may be employed include metals, metal alloys, metal/metal composites, and the like. Typically the metallic material will have less than about 5 wt. % (e.g., less than about 1 wt. %) polymeric material and more typically will be substantially entirely free of polymeric material. The metallic material preferably is a material that is capable of being resistance welded. Any of the metals that may be used for the metallic layer of the composite material may be used for the metallic material (e.g., the metallic material of a' second or additional workpiece) Without limitation, exemplary metallic materials that may be employed include metals and metal alloys including at least about 50 weight % iron atoms or at least 50 wt. % aluminum atoms, based on the total weight of the metallic layer (e.g., in the zone or region to be welded).

If employed, the metallic material may be the same or different from the metallic layer of the metallic layer of the composite material to which it will be welded.

Test Method for Weld Current Range

A measure of the processing window for welding is the current range (i.e., weld current range). The weld current range for a test material may be measured by welding a stack consisting of a sheet of the test material and a sheet of a control monolithic steel (such as a sheet of galvanized steel) having the same thickness as the sheet of the test material. The weld may be performed using two electrodes. The electrode against the test material has a face diameter, d. The electrode against the sheet of the control steel may be equal to or greater than d. The weld time and the weld pressure are fixed and may be predetermined, such as from a standard weld schedule for a material. The weld button size may be measured by separating the two sheets and is given as the average diameter of the weld button. The measurement is started by selecting a current that produces a weld button greater than 0.95 d. The weld current is then decreased incrementally until the diameter of the weld button is less than d. The lower limit of the weld current is the lowest current that produces an acceptable weld (e.g., a weld having a weld button size of at least 0.95 d). The weld current is then increased until an unacceptable weld is obtained, characterized by metal expulsion, sticking of a sheet to an electrode, a loud weld popping noise, or otherwise, or any combination thereof. The highest current that produces an acceptable weld is the upper limit of the weld current. The weld current range is the difference between the upper limit of the weld current and the lower limit of the weld current. By way of example, the weld current range may be performed using a composite material having a thickness of about 0.8 mm, and galvannealed steel sheet having a thickness of about 0.8 mm. The electrode on the composite material may have a diameter of about 3.8 mm and the electrode on the galvannealed steel may have a thickness of about 4.8 mm. A compressive force of about 2713 Nt (e.g., 610 pounds) force may be applied. The weld conditions for measuring the weld current range may include a mid frequency DC weld current having a frequency of about 1,000 Hz, an upslope time of about 50 milliseconds, and a weld time of about 200 milliseconds. The materials preferably have a width of about 25 mm and a thickness of 25 mm or 75 mm.

Figure 5:
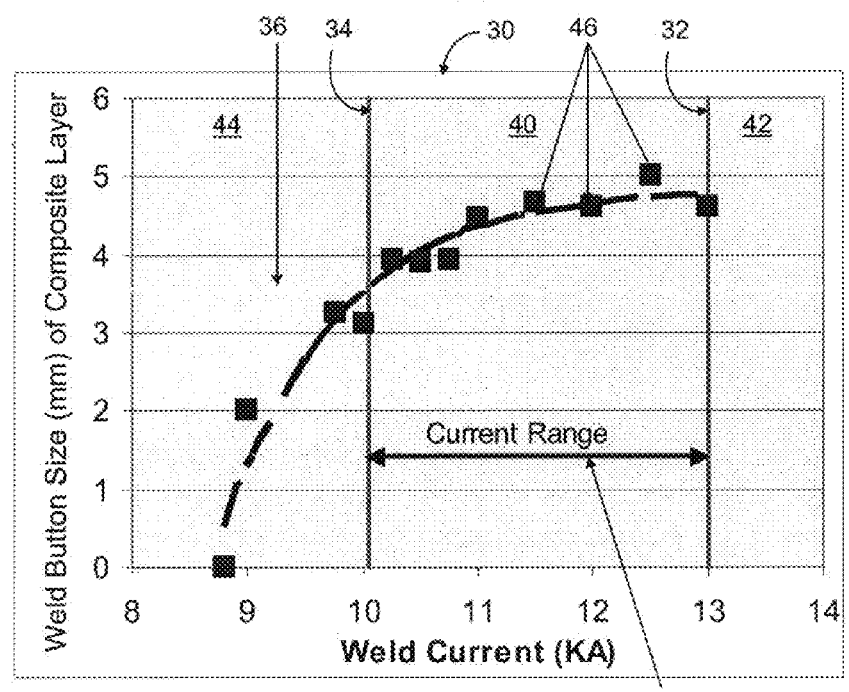
FIG. 5 is a graph showing the relationship between the weld button size (in units of mm) and the weld current (in units of kA) for a lightweight composite material welded to galvannealed metal having a weld current range of about 2.0 kA, or more.

The weld current range for the composite material, $I_c$, when welded to a sheet of monolithic steel having the same thickness as the composite material is preferably greater than the current range for two monolithic sheets of steel, $I_m$, having the same thickness as the composite material. The ratio of to $I_c$ to $I_m$ is preferably about 1.1 or more, more preferably about 1.2 or more, even more preferably about 1.3 or more, even more preferably about 1.4 or more, and most preferably about 1.5 or more. The current range of the composite material, $I_c$, preferably is about 1.5 kA or more, more preferably about 1.7 kA or more, even more preferably about 1.9 kA or more, even more preferably about 2.1 kA or more, even more preferably about 2.3 kA or more, and most preferably about 2.5 kA or more. FIG. 5 illustrates the weld current range for a composite material having a surprisingly high weld current range.

When spot welding the composite material to one or more monolithic metal material (e.g., a steel material such as a steel sheet), the process may employ a first electrode that contacts the composite material and a second electrode that contacts a monolithic metal. The first electrode and the second electrode may be the same or different. Surprisingly, composite materials of the present invention may employ a first electrode and a second electrode having the same diameter, even when the volume of metal in the composite material is 30% or more less than the volume of metal in the monolithic metal material. For particularly difficult welds, it may be desirable that the first electrode and the second electrode are different. For example, when the first electrode has a diameter that is less than the diameter of the second electrode, both metallic layers of the composite material may be more easily welded to the monolithic metal material. Without being bound by theory, it is believed that the use of a smaller diameter electrode to contact the composite material results in a more balanced heat distribution, more effectively removes polymer from the weld zone, or both. Most preferably, the first electrode has a diameter that is sufficiently less than the diameter of the second electrode, so that the first metallic layer and the second metallic layer are both welded during a spot welding process. The ratio of the diameter of the second electrode to the diameter of the first electrode preferably is about 1.02 or more, more preferably about 1.06 or more, even more preferably about 1.12 or more, and most preferably about 1.2 or more. The ratio of the diameter of the second electrode to the diameter of the first electrode preferably is about 5 or less, more preferably about 3 or less, and most preferably about 2 or less.

The composite materials of the present invention preferably can be welded to one or more monolithic metal materials. For example, the shape, size, concentration, and type of the metallic fibers may selected so that the composite material is capable of being welded (e.g., spot welded) to steel materials selected from the group consisting of uncoated steel, hot dipped galvanized steel, galvannealed steel, or any combination thereof. In particularly preferred embodiments of the invention, the composite material has a generally high weld current range (e.g., as described hereinbefore) for two or more different monolithic steel materials (e.g., two or more of uncoated steel, hot dipped galvanized steel, or galvannealed steel), for two or more monolithic steel materials having different thickness (e.g., one material having about the same thickness as the composite material and a second material having a thickness about 1.5 times the thickness of the composite material or more), or both, without the need to change the weld time, the electrode force, the weld time, or the weld electrode size. As such, the composite material may be welded to a surprisingly wide variety of materials, having a surprisingly wide range of thicknesses without needed to change the welding conditions. Although some changes to welding conditions may be required, the large weld current range allows for these changes to be greatly reduced relative to other materials.

Figure 6:
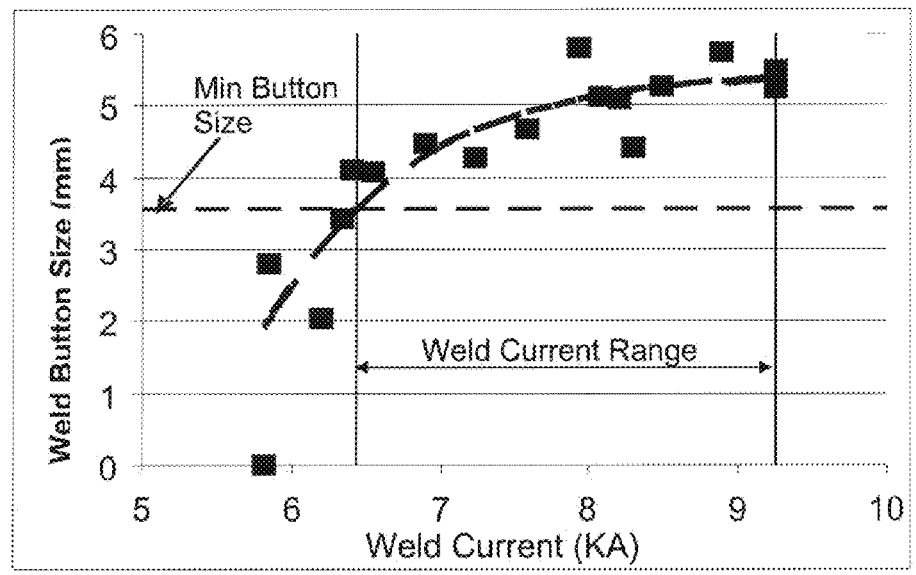
FIG. 6 is a graph showing the relationship between the weld button size (in units of mm) and the weld current (in units of kA) for a lightweight composite material welded to uncoated deep drawing quality steel having a weld current range of about 2.0 kA, or more.
Figure 7:
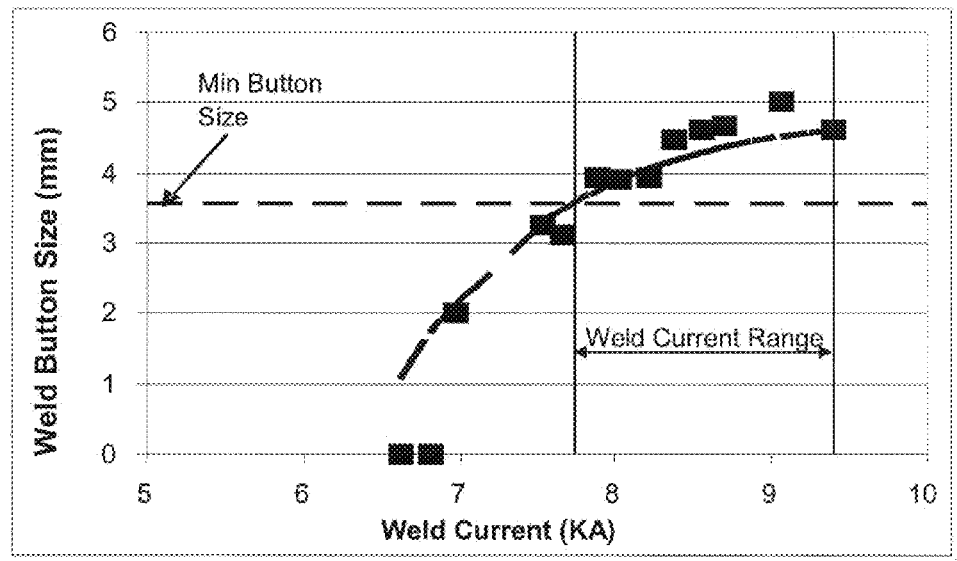
FIG. 7 is a graph showing the relationship between the weld button size (in units of mm) and the weld current (in units of kA) for a lightweight composite material welded to galvannealed metal having a weld current range of about 1.5 kA, or more (e.g., about 1.7 kA).
Figure 8:
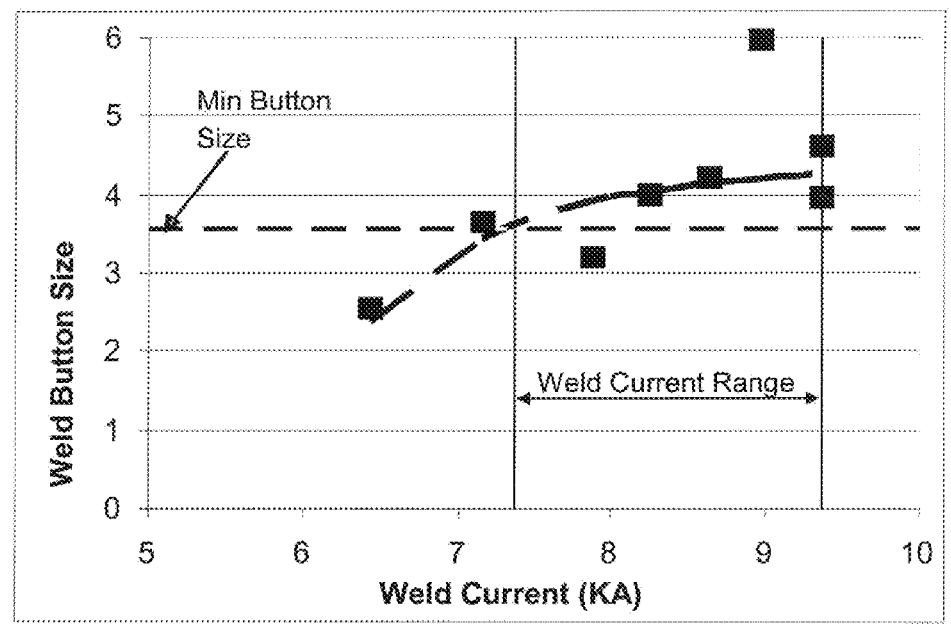
FIG. 8 is a graph showing the relationship between the weld button size (in units of mm) and the weld current (in units of kA) for a lightweight composite material welded to hot dipped galvanized coated metal having a weld current range of about 1.5 kA, or more.

By way of example, FIGS. 6, 7 and 8 illustrate the measurement of the weld current range for a composite material of the present invention welded to uncoated steel, galvannealed steel, and hot dipped galvanized steel respectively. FIGS. 6, 7, and 8 are graphs showing the weld button size as a function of the weld current. Acceptable or good welds may be those welds which have i) a weld button size greater than about 95% of the weld electrode diameter ii) no expulsion of metal; or both. For example, when an electrode diameter of about 3.8 mm is used to contact the composite material, a good weld may have a weld button size of about 3.6 mm or more. FIGS. 7, 8, and 9 illustrates a composite material having a weld current range of about 1.5 or more (e.g., about 1.7 or more). FIG. 6 illustrates that good welds can be obtained with a weld current from about 6.4 kA to about 9.2 kA when welding the composite material to a first steel (e.g., uncoated steel). FIG. 7 illustrates that good welds can be obtained with a weld current from about 7.75 kA and about 9.45 kA when welding the composite material to a different steel (e.g., galvannealed steel). FIG. 8 illustrates that good welds can be obtained with a weld current from about 7.35 kA and about 9.35 kA when welding the composite material to another steel (e.g., hot dipped galvanized steel). First, all three materials give generally high weld current ranges. Second, the overlap of the currents that result in good welds (i.e., the overlapping weld current range) is generally high. For example, the composite material produces good welds with these three materials from about 7.8 kA to about 9.2 kA, and the overlapping weld current range is about 1.4 kA or more.

Welding Process

The process used for joining the composite material may include a modification of a conventional welding technique such as resistance welding (e.g., spot welding, seam welding, flash welding, projection welding, or upset welding), energy beam welding (e.g., laser beam, electron beam, or laser hybrid welding), gas welding (e.g., oxyfuel welding, using a gas such as oxyacetylene), arc welding (e.g., gas metal arc welding, metal inert gas welding, or shielded metal arc welding). Preferred joining techniques include high speed welding techniques such as resistance spot welding and laser welding.

Figure 9A:
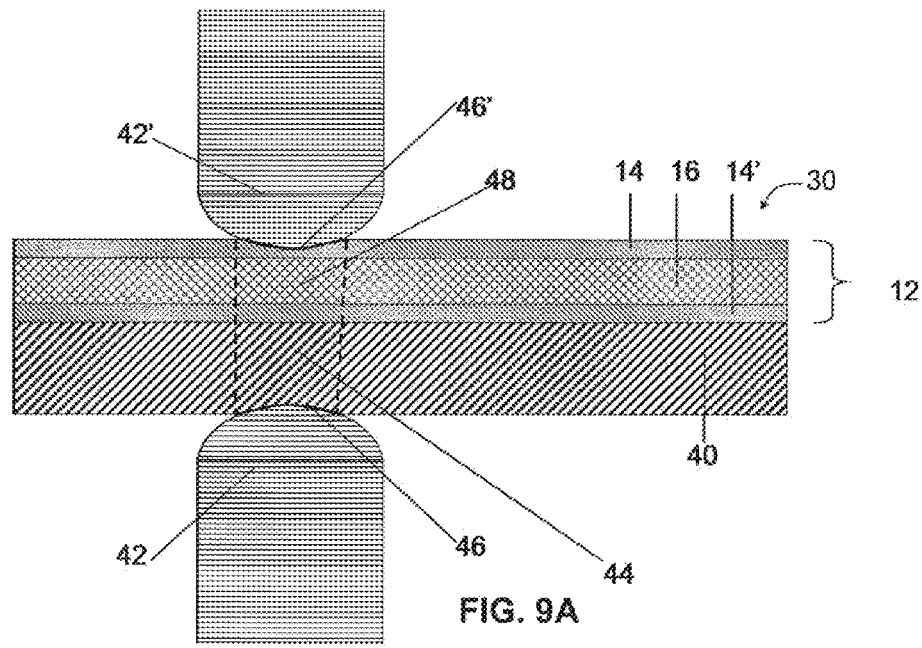
FIGS. 9A and 9B are a portion of a cross-section of an illustrative weld stack during a welding process at different times in the welding process.
Figure 9B:
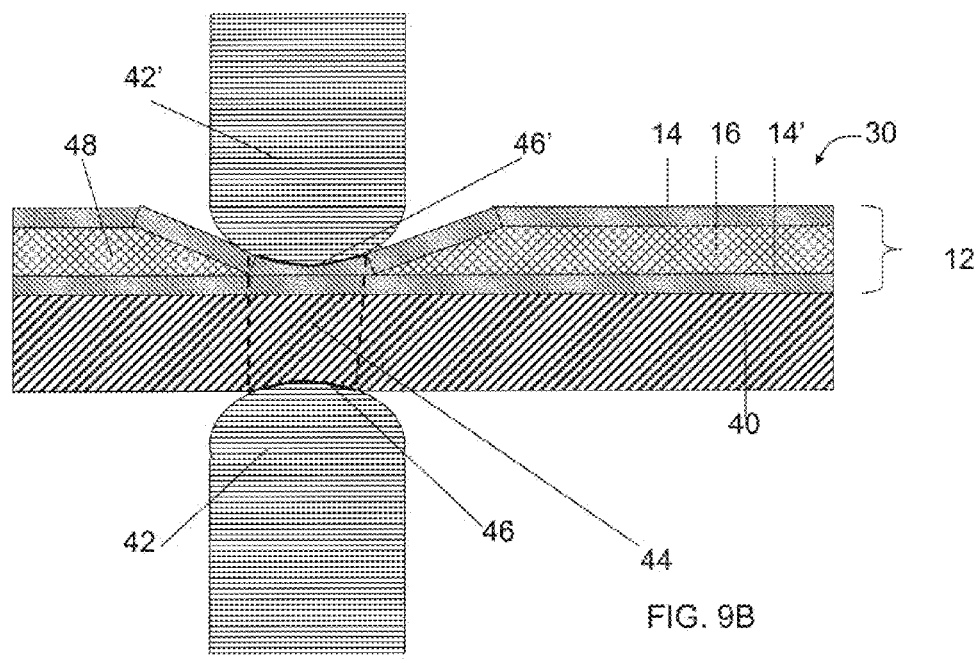

FIGS. 9A and 9B are portions of cross-sections illustrating a stack of substrates 30 being welded between two weld electrodes 42, 42'. FIG. 9A illustrates the cross-section at a weld time earlier than the cross-section illustrated in FIG. 9B. With reference to FIG. 9A, the welding process may include a step of applying a pressure to two weld electrodes 42, 42', such that the composite material 12 and a second substrate 40 are in compression. The pressure of the weld electrodes 42, 42' may form an area of contact 46 with the second substrate and an area of contact 46' with the composite material. It will be appreciated that the composite material 12 may be sandwiched between the second substrate 40 and a third substrate (not shown) so that the area of contact 46' is defined by the contact of a weld electrode and the third substrate. The volume 48 of the materials to be welded that lie between the areas of contact 46, 46' define a region to be welded (i.e., an intended weld zone) 44. It will be appreciated that the volume of the actual weld zone may be larger or smaller than the intended weld zone 44 and that the height of the weld zone may be decreased if material (e.g., polymer, filler, metallic material, or any combination thereof) is forced from the intended weld zone (e.g., by the force applied by the weld electrodes). As illustrated in FIG. 9A, the substrates may be deformed (e.g., plastically deformed), particularly near the areas of contact 46, 46'. Turning now to FIG. 9B, during the welding process, the temperature of the substrates (e.g., in or near the intended weld zone) may increase so that some or all of the polymer may undergo a phase transition (e.g., a first order solid to liquid phase transition (i.e., melting) of a semi-crystalline polymer, or a second order softening transition of a glassy polymer). Upon melting or softening, the polymer may flow under the pressure of the weld electrodes. As such, some or all of the polymeric material (e.g. some or all of the thermoplastic polymer, some or all of the filler, or both) may be expelled from the intended weld zone 44 into a region 48 away from the intended weld zone. When material flows away from or is otherwise expelled from the intended weld zone 44, the distance between the weld electrodes 42, 42' may decrease. Thus, a change in the distance between the weld electrodes may be employed as an indication that the polymers has undergone a phase transition. It will be appreciated that the weld process may include one or more means for cooling a weld electrode (e.g., by flowing a liquid, such as a coolant fluid, into an inlet in the electrode).

Figure 10:
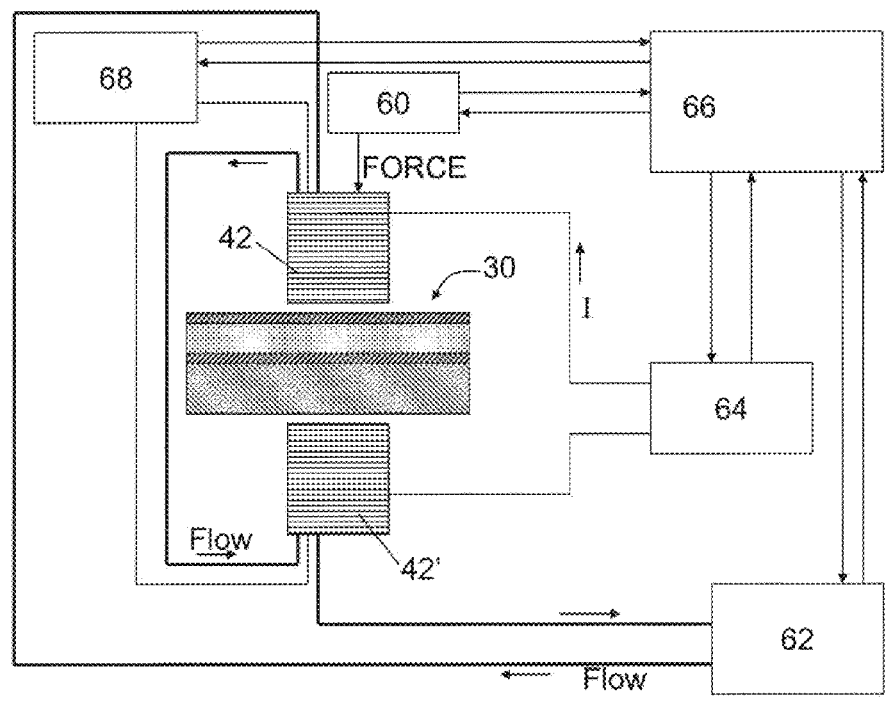
FIG. 10 is an illustrative device for resistance welding.

The welding process may employ a resistance welding device that is capable of supplying a current to a stack of substrates to be welded. With reference to FIG. 10, the welding device may have two or more weld electrodes 42, 42', a means of applying a pressure 60 to the weld electrodes (e.g., so that the portion of the stack of substrates 30 between the weld electrodes are compressed), a pumping device 62 for circulating a heat transfer fluid through one or more of the weld electrodes (e.g., for removing heat from the weld electrodes), a power supply 64 (e.g., for applying an electrical potential between the weld electrodes so that current flows through substrates between the weld electrodes), one or more controllers 66 (such as a weld controller) for controlling the power to the weld electrodes, the current through the weld electrodes, the weld time, the cooling of the weld electrodes, the pressure applied to the substrates by the weld electrodes, or any combination thereof. The welding process may additionally employ a monitoring device for monitoring or otherwise measuring one or more preselected conditions, as described hereinafter. The monitoring device may be part of the controller or separate from the controller. Without limitation, the monitoring device may include a position sensor 68 that monitors the movement of one or more of the weld electrodes (e.g., so that the change in the distance between the weld electrodes may be monitored). The stack of substrates to be welded may be fed into the welding device manually, automatically fed into the welding device (e.g., using a robot, a conveyor line, or the like), a portion of the welding device including the weld electrodes may move to the stack of substrates to be welded (e.g., the welding device may be movable, such as a portion of a welding device attached to an arm of a robot), or any combination thereof.

The welder may include a means of flowing or circulating a fluid through one or more of the weld electrodes. For example, the welder may include a source of water, coolant, or other fluid that flows or circulates through one or more of the weld electrodes. The fluid (e.g., flowing into a weld electrode) may be relatively cool (e.g., compared to the weld stack being heated during the welding process) so that heat is removed from the weld electrode during the first weld stage, the second weld stage, or both. The fluid may remove sufficient heat so that the weld electrode does not stick to the materials in the weld stack. The flow rate of the fluid, the temperature of the fluid, or both may be controlled by one or more controllers. In a preferred aspect of the invention, the temperature of the fluid is less than the transition temperature of the polymer. For example, the fluid may have a temperature that is less than the melting temperature of the polymer, less than the glass transition temperature of the polymer, or both. The temperature of the fluid may be less than about 200° C., preferably less than about 130° C., more preferably less than about 60° C., even more preferably less than about 30° C., and most preferably less than about 20° C.

In general the welding process includes a step of placing two or more substrates to be welded together (i.e., a stack of materials to be welded together) in a welding device (e.g., by moving the stack of materials to the device, moving the device to the materials, or both), one or more of the substrates being a first composite material that includes at least a first metallic layer and a polymeric layer having a polymer, and one or more conductive fillers. A multi-stage welding process may include a step of at least partially welding the substrates together in a first weld stage under a first processing condition, so that at least a portion of the polymer undergoes at least one phase transition. A multi-stage welding process may include a step of altering (e.g., automatically altering) the first processing condition to a different processing condition following the at least one phase transition; and further welding the materials in a second weld stage using the different processing condition so that a weld joint including at least a part of the first composite material is formed. It will be appreciated that the step of automatically altering the first process condition may employ an open-loop control operation, a closed-loop control operation, or both.

Preferably the processing condition for the first weld stage, the second weld stage, or both are preselected conditions. However, the processing condition for the first weld stage, the second weld stage, or both may be determined by monitoring or measuring one or more preselected conditions and comparing the information about the preselected condition with a predetermined desired value for the preselected condition. For example, the process may include a step of measuring or monitoring, prior to the first weld stage, one or more preselected conditions (e.g., a condition that indicate the weld time or weld energy at which at least a portion of the polymer is likely to undergo the phase transition). Exemplary preselected conditions that may be measured or monitored include an electrical property of the first composite material, an electrical property of the polymeric layer, an electrical property of a weld stack including the two or more substrates to be welded together, the thickness of the weld stack, the diameter of the weld electrode, or any combination thereof.

The welding process may result in a weld zone in which the thickness of the polymeric layer of the composite material is reduced (e.g., by at least about 30%, preferably at least about 70%) relative to the thickness of the polymeric layer away from the weld zone (e.g., the thickness of the polymeric layer prior to the welding process). The welding process may result in a weld zone in which the polymer concentration (or volume of polymer) in the weld zone is reduced are even substantially eliminated. For example the concentration or volume of polymer in the weld zone may be reduced by at least about 50%, preferably at least about 70%, more preferably at least about 95%.

First Weld Stage

The welding process will typically include a first weld stage which partially, or completely melts or softens the polymer (e.g., in the intended welded zone). The first weld stage employs a first processing condition. The first processing condition may be selected to provide sufficient heat into the intended weld zone to cause the phase transition in the polymer. The first processing condition may include a weld time (e.g., a number of weld cycles), a weld pressure, a weld current, a weld voltage, a weld power, a weld energy, or any combination thereof.

It will be appreciated that during the first weld stage, as the current flows through the weld stack, heat will be generated by the electrical resistance of the weld stack. The polymeric layer of the composite material typically will have a much higher electrical resistance than the remainder of the weld stack. As such, most of the heat generated by the weld stack may be generated in the polymeric layer or layers that are present in the weld stack. The instantaneous rate of heat generation may estimated by equation 2:

$$dH/dt = P = I(t)^2 R_{PL} \quad \text{(Equation 2)}$$

where I(t) is the instantaneous current, and $R_{PL}$ is the resistance of the polymeric layer. The current may have a periodicity (such as in an alternating current), may vary between weld cycles, or both. The resistance of the polymeric layer may also vary with time. For example the electrical resistivity of the polymeric material may change (e.g., as the temperature of the polymeric layer is increased), the thickness of the polymeric layer in the intended weld zone may change, the concentration of polymer in the polymeric layer in the intended weld zone may change, the concentration of the filler in the intended weld zone may change, or any combination thereof.

The energy provided during the first weld stage may be estimated by integrating Equation 2 over the weld time of the first weld cycle. Some of this energy may be used to heat the polymeric layer, to melt or soften the polymeric layer, or both. It will be recognized that some of the heat will also be dissipated (e.g., by thermal conduction). The thermal conductivity of the polymeric layer may be relatively low (e.g., less than the thermal conductivity of the metallic layer) so that the rate of heat dissipation is relatively low. Preferably, the first processing condition provides sufficient heat to increase the temperature of the polymer to its phase transition temperature and cause at least some (e.g., all) of the polymer (e.g., in the intended weld zone) to melt or soften (e.g., even when considering the possibility of heat dissipation). Preferably, the first processing condition does not provide sufficient heat to melt some or all of the metallic layer of the composite material in the intended weld zone.

It will be appreciated that the polymer of the polymeric layer of the first composite material may be characterized by a phase transition temperature (e.g., a first peak melting or a first glass transition temperature), and the metallic layer of the first composite material may be characterized by a second peak melting temperature. Preferably the first transition temperature is less than the second peak melting temperature.

The first transition temperature may be less than about 350° C., preferably less than about 300° C., and more preferably less than about 250° C. The second transition temperature may be greater than about 375° C., preferably greater than about 400° C., and more preferably greater than about 450° C.

Without limitation the weld time for the first weld stage may be at least 1 cycles (i.e., 1/60 second), preferably at least 2 cycles (i.e., 2/60 seconds), more preferably at least 3 cycles (i.e., 3/60 seconds), even more preferably at least 4 cycles (i.e., 4/60 seconds), and most preferably at least about 5 cycles (i.e., 5/60 seconds). The weld time for the first weld stage may be less than about 30 cycles, preferably less than about 25 weld cycles, more preferably less than about 20 weld cycles, and most preferably less than about 15 weld cycles. Longer weld times may be employed if needed to melt or soften the polymer.

The weld current for the first stage may be less than about 20 kA, preferably less than about 10 kA, more preferably less than about 3 kA, even more preferably less than about 1 kA, even more preferably less than about 0.5 kA, even more preferably less than about 0.2 kA, and most preferably less than about 0.1 kA.

The weld current for the first weld stage may vary during the first weld stage. For example, the first weld stage may use an upslope weld current, starting at an initial current (which may be 0 or more) and increasing the current (e.g., until a final current is reached). The increase in the current may be incremental (e.g., step-wise increases), continuous, or both.

The ratio of the weld current to the area ($A_c$) of contact between the weld electrode and the weld stack (i.e., $I/A_c$) may be relatively low. For example, $I/A_c$ may be less than about 50 kA/cm$^2$, preferably less than about 10 kA/cm$^2$, more preferably less than about 2 kA/cm$^2$, even more preferably less than about 0.5 kA/cm$^2$, even more preferably less than about 0.1 kA/cm$^2$, and most preferably less than about 0.02 kA/cm$^2$.

The voltage for the first weld stage preferably is sufficient to at least partially melt or soften the polymer. The voltage for the first weld stage may include a voltage greater than about 0.1 volts and preferably greater than about 1 volt.

The power density during the first weld stage preferably is sufficient to at least partially melt or soften the polymer. For example, the rate of heat generation in the intended weld zone (e.g., between a pair of electrodes) preferably is at least about 1 W/cm$^2$, more preferably at least about 5 W/cm$^2$, even more preferably at least about 15 W/cm$^2$, and most preferably at least about 30 W/cm$^2$.

The welding process may include a step of monitoring the first weld stage for one or more preselected conditions that indicate that at least a portion of the polymer has undergone a phase transition. For example, the welding process may monitor a condition such as a weld electrode pressure; a weld current; a weld time; a voltage; an energy; a power; an electrical property of the first composite material; an electrical property of a weld stack including the two or more substrates to be welded together; a change in position of a substrate, a layer of the composite material, a weld electrode, or any combination thereof; a temperature of a weld electrode, a material, a heat transfer fluid, or any combination thereof; or any combination thereof.

The weld electrodes may apply a compressive force and pressure on the weld stack including the first composite material. The force and/or pressure employed in the first weld stage, the second weld stage, an additional optional weld stage, or any combination thereof may be a pressure that is sufficient to create a contact between the first composite material and another material in the weld stack. The weld force and/or pressure may be sufficiently low so that a metallic layer of the composite material does not tear or crack. The weld force may be greater than about 100 Nt, preferably greater than about 300 Nt, and more preferably greater than about 1000 Nt. The weld force may be less than about 100,000 Nt, preferably less than about 30,000 Nt, and more preferably less than about 10,000 Nt. Without being bound by theory, it is believed that the compressive force and pressure the weld electrodes exerts on the weld stacks reduces the electrical resistance in the weld stack in the region between the weld electrodes, so that a significant amount of the weld current (e.g., at least about 5%, at least about 10%, at least about 15%, at least 20%, at least about 25%, at least about 30%, or at least about 35%) passes through the portion of the weld stack between the weld electrodes.

Second Weld Stage

The second weld stage preferably uses a processing condition that is different from the first processing condition employed in the first weld stage. The second weld stage may be used to melt some or all of the metallic layer of the composite material, to melt any metallic materials in the weld stack, or both.

As described above, the process may include a step of altering the first process condition to a second process condition (such as used in the second weld stage). Without limitation, the step of altering the first process condition may include changing the current (e.g., increasing the current), changing the power, changing the voltage (e.g., decreasing the voltage), changing the energy, changing the weld pressure, changing the weld time, or any combination thereof.

The second weld stage may employ a processing condition (such as a weld time, weld pressure, weld heat, weld current, or any combination) that partially or preferably completely melts the metallic layer of the composite material. Without limitation, any welding conditions known in the art for joining the metallic materials in the substrates may be employed in the second weld stage. Such welding conditions typically depend on the thickness of the substrates, the metals or metal alloys being welded, any coating that may be on the substrates, the class of finish desired (e.g., class A surface), and the like. It will be appreciated that the art known welding conditions may be increased by as much as 100%, or decreased by as much as 60%.

Without limitation the second weld stage may employ a weld current greater than about 0.5 kA, preferably greater than about 3 kA, more preferably greater than about 4 kA, and most preferably greater than about 5 kA. The ratio $I/A_c$ for the second weld stage may be greater than about 5 kA/cm$^2$, preferably greater than about 10 kA/cm$^2$, more preferably greater than about 20 kA/cm$^2$, even more preferably greater than about 30 kA/cm$^2$, even more preferably greater than about 45 kA/cm$^2$, and most preferably greater than about 60 kA/cm$^2$.

Without limitation the weld time for the second weld stage may be at least 1 cycles (i.e., 1/60 second), preferably at least 2 cycles (i.e., 2/60 seconds), more preferably at least 3 cycles (i.e., 3/60 seconds), even more preferably at least 4 cycles (i.e., 4/60 seconds), and most preferably at least about 5 cycles (i.e., 5/60 seconds). The weld time for the second weld stage may be less than about 30 cycles, preferably less than about 25 weld cycles, more preferably less than about 20 weld cycles, and most preferably less than about 15 weld cycles. Longer weld times may be employed if needed (e.g., to melt the metallic material, the metallic layer, or both).

Preferably the second weld stage is a stage that delivers current through the weld stack. As such, the second weld stage preferably does not consist entirely of hold cycles (i.e., applying a pressure for the entire stage without applying a current). The weld time of the second weld stage may be longer than, shorter than, or the same as the weld time of the first stage.

Open-Loop and Closed-Loop Control Operation

The welding process may include an open-loop control operation, a closed-loop control operation, or both. For example, the welding process may include a loop control operation that includes a step of monitoring one or more weld stages (e.g., the first weld stage) for one or more preselected conditions (such as a condition that may indicate that at least a portion of the polymer has undergone a phase transition), a step of comparing information about the preselected condition with a predetermined desired value for the preselected condition; a step of automatically altering the first processing condition to a different processing condition based on the information obtained from the comparing step; a step of automatically altering the weld time of the first weld stage based on the information obtained from the comparing step, or any combination thereof.

Examples of open-loop and closed-loop control operations that may be employed include those described in paragraphs 0065 through 0075 of U.S. Provisional Patent Application Nos. 61/290,384 (filed on Dec. 28, 2010).

Processes that are free of an open-loop and a closed-loop control operation may also be employed. Such a process may be particularly suitable for welds that are not shunted. The process may include a step of measuring one or more initial reading of a preselected condition. For example, the process may include a step of measuring an initial reading of a current, voltage, or resistivity. The one or more initial reading preferably are taken prior to the start of the first welding stage. The process may include a step of selecting one or more welding conditions for the first welding stage based on the one or more initial readings. For example, the initial reading may be employed to determine the weld time for the first welding stage (e.g., the number of weld cycles), the voltage for the first welding stage, the power for the first welding stage, the current for the first welding stage, or any combination thereof.

The welding process may be used to prepare a welded structure or a weld joint) that includes a composite material and a second substrate (such as a weld joint that includes two composite materials), or a welded structure or a weld joint that includes a composite material and two or more additional substrates. Surprisingly, we are able to achieve a microstructure that includes a fused joint including the first metallic layer and the second metallic layer of the composite material and a substrate material, where some of, or all of the thermoplastic polymer of the filled polymeric material has been removed from the weld joint. As such, the weld joint may include a portion of the first metallic layer and a second metallic layer of a composite material. FIG. 11 is an example of a microstructure of a weld joint.

Additional Features

For multi-stage welding, it will be appreciated that the welding process may include one or more additional weld stages before the first weld stage, one or more additional weld stages between the first and second weld stage, one or more additional weld stages after the second weld stage, or any combination thereof. An additional weld stages, if employed, may be at least 3 weld cycles (i.e., at least 3/60 seconds) or may be less than 3 weld cycles. For example at least 3 weld cycles may lapse between the first weld stage and the second weld stage. Preferably, less than 3 weld cycles elapses between the first weld stage and the second weld stage. The one or more additional weld stages may include a transition weld stage between the first weld stage and the second weld stage.

The transition weld stage, if employed, may include an open-loop or a closed-loop control. During the transition weld stage (e.g., using a controller) the current may increase or decrease one or more times, the voltage may increase or decrease one or more times, the power may increase or decrease one or more times, the electrode force may increase or decrease one or more times, or any combination thereof. During the transition weld stage, one or any combination of the current, the voltage, the power, or the electrode force, may change (e.g., using a controller) in a stepwise form. During the transition weld stage, one or any combination of the current, the voltage the power, or the electrode force, may change (e.g., using a controller) in response to a measured value for one or more preselected transition stage conditions. During the transition weld stage a controller may be employed for ensuring a constant or predetermined variation in the current, voltage, power, electrode force, or any combination thereof. A transition weld stage may be employed to transition from a stage at which at least some of the polymer has been heated above its melting temperature and/or glass transition temperature to a stage at which the polymer has been generally displaced from the region between the weld electrodes. During the transitional weld stage, the electrical resistance of the composite material between the weld electrodes may change greatly. For example the electrical resistance of the composite material between the weld electrodes may decrease by at least 50%, preferably at least 90% in one, two or more, or even all of the weld cycles of the transitional weld stage. As the resistivity and/or resistance decreases in the transitional weld stage, a weld controller or other processor may be employed to compare one or more preselected transition stage conditions with a preselected value. The controller may automatically alter the conditions for one or more remaining weld cycles, automatically transition to another weld stage, or both.

One or more of the materials in the weld stack may be formed prior, during, or after welding. For example, the weld stack may include a composite material that has been formed. As such, the composite material may be formable. For example, composite materials employed in the present invention may be subjected to a suitable forming process, such as a process that plastically deforms a material and may include a step of stamping, roll forming, bending, forging, punching, stretching, coiling, some other metalworking, or any combination thereof. A preferred forming process is a process that includes a step of stamping the composite material. The stamping process may occur at or near ambient temperatures. For example, the temperature of the composite material during stamping may be less than about 65° C., preferably less than about 45° C., and more preferably less than about 38° C. It will be appreciated that processing conditions at temperatures greater than about 65° C. may also be employed for forming the composite material. The forming process may involve drawing regions of the composite material to various draw ratios. In one aspect of the invention, the composite material is subjected to a step of drawing to a relatively high draw ratio without breaking, wrinkling, or buckling. For example, it is subjected to a step of drawing so that at least a portion of the composite is drawn to a draw ratio greater than 1.2. Desirably, the composite material may be capable of being drawn and is drawn to a maximum draw ratio greater than about 1.5, preferably greater than about 1.7, more preferably greater than about 2.1, and most preferably greater than about 2.5. The cracking limit of the draw ratio may be determined using the circular cup drawing test as described by Weiss et al. (M. Weiss, M. E. Dingle, B. F. Rolfe, and P. D. Hodgson, "The Influence of Temperature on the Forming Behavior of Metal/Polymer Laminates in Sheet Metal Forming", Journal of Engineering Materials and Technology, October 2007, Volume 129, Issue 4, pp. 534-535), incorporated herein by reference. The forming process may include a step applying a pressure to a die (e.g., a die having a hardness, as measured according to Mohrs hardness scale, greater than the hardness of the metallic particles or fibers of the composite material) in contact with the composite material.

A particularly preferred stamping or drawing process is a process that operates at greater than about 1 stroke (e.g., 1 part) per minute, more preferably greater than about 5 strokes per minute, even more preferably greater than about 25 strokes per minute, and most preferably greater than about 60 strokes per minute. The stamping process may include a blank holding force to hold a periphery of the blank (i.e., a periphery of the composite material being stamped). Preferably, the blank holding force is greater than about 0.03 kg/mm$^2$, more preferably greater than about 0.10 kg/mm$^2$, and most preferably greater than about 0.18 kg/mm$^2$. The stamping process may include one, two, or more drawing steps. Preferably, the maximum draw for the first draw of the stamping process (as measured by the maximum % reduction in thickness) is less than about 60%, more preferably less than about 50% and most preferably less than about 45%. In addition to drawing the material, the stamping process may include one or more steps of piercing the part, trimming the part, flanging the part, or any combination thereof, which may be a separate step or may be combined (e.g., with a drawing step).

EXAMPLES

Example 1

Example 1 is a composite material including a polymeric layer containing about 15 volume % stainless steel fiber and about 85 volume % of a polyamide copolymer. The fibers are generally cylindrical and have a cross-section of less than about 9×10$^{-6}$ mm$^2$. The polyamide copolymer has a melting temperature of about 130° C. The polyamide copolymer is a neat resin and thus free of plasticizer or other additives having a boiling point less than about 300° C. The polymeric layer has a thickness of about 0.4 mm and is sandwiched between two metallic layers. The metallic layers are made of low carbon steel and each have a thickness of about 0.2 mm. The first metallic layer is coated with BONAZINC® corrosion and chip resistant coating available from PPG Industries, Pittsburgh, Pa., USA, and the second metallic layer is free of a coating. The surfaces of the metallic layers are cleaned and dried prior to preparing the composite.

Example 2

Example 2 is prepared by welding the composite material of Example 1 to a sheet of cold rolled steel having a thickness of about 0.6 mm. The two substrates to be welded are arranged so that the uncoated metallic layer of the composite material is in contact with the sheet of cold rolled steel. One set of weld conditions is employed including a weld pressure of about 4 MPa, a weld electrode diameter of about 6 mm, a weld current of about 5 kA and a weld time of about 5 cycles. The resistivity is too high and the materials do not weld together.

Example 3

Example 3 is prepared using the same method as Example 2, except a two stage welding process is employed. The first weld stage includes a welding pressure of about 10 MPa, a weld electrode diameter of about 6 mm, a weld current of less than about 0.5 kA. During first weld stage, the displacement of the weld electrodes are monitored and compared to a predetermined target value of about 0.2 mm (i.e., the separation between the weld electrodes is reduced by 0.2 mm compared with the separation at the start of the welding operation) using an open-loop or a closed-loop control operation. After about 8 weld cycles using the first processing conditions, the displacement is determined to exceed the target value. The processing conditions is automatically altered to a second welding process condition which includes increasing the weld current to about 5 kA, decreasing the weld pressure to about 4 MPa, and setting the weld time to about 4 cycles. A good weld is obtained.

Example 4

Example 4 is prepared by welding two substrates that are both 0.8 mm thick cold rolled steel. No composite material is used in this example. The weld processing condition of Example 2 are employed. A good weld is obtained.

Example 5

A filled thermoplastic material is prepared by mixing about 15 volume % low carbon steel fibers having a generally cylindrical shape with an average cross-sectional area in the plane transverse to the length of the fibers of about $8 \times 10^{-4}$ mm$^2$ or less, a length from about 1 to about 10 mm and about 85 volume % of a copolyamide of about 50 wt. % polyamide 6 and about 50 wt. % polyamide 6,9 (the copolymer characterized by an elastic modulus of about 300 MPa measured according to ISO 527-2, a melting point of about 130° C. as measured according to ISO 11357, and an elongation at break of about 900% measured according to ISO 527-3). The filled thermoplastic material is mixed at a temperature from about 190° C. to about 250° C. The filled thermoplastic material is then placed between two sheets of low carbon steel, each having a thickness of about 0.2 mm. The materials are then pressed at a temperature from about 200° C. to about 230° C. with a pressure of about 1 to about 22 MPa. The composite material has a core thickness of the filled thermoplastic material of about 0.4 mm. The composite material is stamped in a high speed stamping operation with a draw ratio greater than about 3, and no cracks or other surface defects are observed. After stamping, the surface of the composite material is relatively smooth compared to the surface of a monolithic low carbon steel sample having the same total thickness and stamped under the same conditions. The composite material has a thickness of about 0.8 mm. The composite material is stacked with a sample of cold rolled steel having a thickness of about 0.8 mm. The stack is placed in a spot welding machine between a pair of weld electrodes having a diameter of about 13 mm. A force of about 2.2 kNt is applied to the weld electrodes. The composite material does not weld to the cold rolled steel.

Example 6

A composite material is prepared using the same materials, composition, and method as Example 6, except the fibers are replaced with low carbon fibers having a generally rectangular cross-section in the direction transverse to the length of the fibers. The fibers have an average length of about 2.3 mm. The average cross-sectional area of the fibers is about 0.0045 mm$^2$. The ratio of the width to the thickness of the fibers is about 2 to 8. The composite material has a thickness of about 0.8 mm. The composite material is stamped in a high speed stamping operation with a draw ratio greater than about 3, and no cracks or other surface defects are observed. After stamping, the surface of the composite material is relatively smooth compared to the surface of a monolithic low carbon steel sample having the same total thickness and stamped under the same conditions. The composite material is stacked with a sample of cold rolled steel having a thickness of about 0.8 mm. The stack is placed in a spot welding machine between a pair of weld electrodes having a diameter of about 13 mm. A force of about 2.2 kNt is applied to the weld electrodes. The resistivity of the composite material in the through-thickness direction is determined while under force of 2.2 kNt. Thus determined, the electrical resistivity of Example 7 composite material is about 0.1 Ω·cm or less. When welded using weld schedules typical for two sheets of cold rolled steel having a thickness of about 0.8 mm, the composite material welds to the cold rolled steel, producing a weld button having a diameter greater than the diameter of the weld electrodes. No extra heating, no extra weld cycles, and no extra current are required to produce a good weld with Example 7.

Example 7

Example 7 is identical to Example 6, except the concentration of the metallic fiber in the filled polymeric material is increased to about 20 volume percent and the concentration of the polymer is reduced to about 80 volume percent. The composite material of Example 8 is welded to a sheet of galvannealed steel having a thickness of about 0.8 mm. An electrode having a face diameter of about 3.8 mm is used on the side of the weld stack having the composite material and an electrode having a face diameter of about 4.8 mm is used on the side having the galvannealed steel. A force of about 610 lbs is applied to the weld stack by the electrodes. The materials are welded using mid frequency DC welding, having a frequency of about 1,000 Hertz. Each weld is done on samples having a width of about 25 mm and a length of about 75 mm. The weld time is constant at about 200 milliseconds. Welds are made using weld currents ranging from about 8.8 ka to over 13 kA. The size of the weld button on the composite sheet is measured after the welding is completed. The weld button size and the weld current of each weld sample 46 is shown in a graph 30 in FIG. 5. At low weld currents given by the region 44, the weld button size is less than the 95% of the diameter of the electrode 36 that is used on the face of the composite material during the welding step. At intermediate weld currents illustrated by the region 40, the button size is greater than 95% of the diameter of the electrode 36. At high weld currents illustrated by region 42, the there is expulsion of metal and/or a loud popping noise during the welding and the resulting welds are unacceptable. The minimum weld current 34 for obtaining acceptable welds is about 10 kA for Example 7. The maximum weld current 32 for obtaining acceptable welds is about 13 kA. The difference between the maximum weld current 32 and the minimum weld current 34 is the current range 38. Thus measured, the weld current range of Example 7 is about 3.0 kA.

Example 8

The weld current range is measured for a weld stack consisting of two monolithic sheets of the galvannealed steel each having a thickness of about 0.8 mm similarly measured and is determined to be less than about 1.3 kA. The weld current range is measured using the same method as for Example 7. Surprisingly, the composite material of Example 7 is easier to weld (i.e., has a broader processing window for welding) than the galvannealed steel, as determined by its higher weld current range (e.g., compared to Example 8).

Example 9

Example 9 is a composite material having the same composition, filled thermoplastic polymer, and structure as Example 7. The weld current range of Example 9 is measured using the same conditions as in Example 7, except the load on the weld electrodes is about 2.76 kN (about 600 lb), the upslope time is about 50 ms, the weld time is about 300 ms, and the initial weld current is about 8-9 kA. The weld current range is first measured for a weld stock consisting of the Example 9 composite material and a sheet of uncoated deep drawing quality steel (i.e., DDQ) having a thickness of about 1.2 mm. The weld button size is measured at different weld currents as shown in FIG. 6. Good welds characterized by i) a button size of about 3.6 mm or more in diameter and ii) no metal expulsion are obtained when the weld current is from about 6.4 kA to about 9.2 kA. The weld current range is determined to be about 2.8 kA for welding the Example 9 to 1.2 mm thick uncoated DDQ.

Next, weld stacks consisting of the composite material and 0.8 mm thick galvannealed steel are prepared and welded using the same conditions as for the uncoated DDQ steel. Surprisingly, good welds are obtained without changing the upslope time, the weld time, the initial weld current, or the load on the weld electrodes. The weld button is measured at different weld currents as shown in FIG. 7. Good welds characterized by i) a button size of about 3.6 mm or more in diameter and ii) no metal expulsion are obtained when the weld current is from about 7.75 kA to about 9.45 kA. The weld current range is determined to be about 1.7 kA for welding the Example 9 composite material to 0.8 mm thick galvannealed steel.

The composite material of Example 9 is also welded to hot dip galvanized steel (i.e., HDG) having a thickness of about 1.5 mm. Weld stacks consisting of the composite material and the 1.5 mm thick HDG are prepared and welded using the same conditions as for the uncoated DDQ steel. Surprisingly, good welds are obtained without changing the upslope time, the weld time, the initial weld current, or the load on the weld electrodes. The weld button is measured at different weld currents as shown in FIG. 8. Good welds characterized by i) a button size of about 3.6 mm or more in diameter and ii) no metal expulsion are obtained when the weld current is from about 7.35 kA to about 9.35 kA. The weld current range is determined to be about 2.0 kA for welding the Example 9 composite material to 1.5 mm thick HDG.

Surprisingly, the same welding conditions can be used for welding the composite material to different types of steel (e.g., DDQ, HDG, or galvannealed steel). Additionally, it is surprising that the composite material is capable of being welded to steel having thickness varying by about 87% (i.e., from 0.8 mm to 0.8 mm×187%=1.5 mm) without changing the welding conditions. It is also surprising that for the different types of steels, and the different thickness of the steel, the welding to the composite material is characterized by generally large weld current ranges.

Example 10

Example 10 is a composite material identical to Example 9 is prepared except the thickness of the core layer is increased to about 1 mm and the thickness of each metal sheet is increased to about 0.5 mm. The composite material is welded to a sheet of cold rolled steel having a thickness of about 2 mm. A multi-stage weld process is required to weld the materials. The multi-stage weld process includes a first weld stage having a first weld current for melting the polymer and a second weld stage including a second weld current higher than the first weld current for fusing the substrate to the composite material.

Example 11A

The composite material of Example 9 is welded to cold rolled steel. A second weld is made about 50 mm from the first weld. Both the first and second welds are made using a single stage weld process. The second weld has arcing from the first weld and the surface is unacceptable.

Example 11B

The composite material of Example 9 is welded to cold rolled steel. A second weld is made about 50 mm from the first weld. A multi-stage weld process is required for the shunted weld the materials. The multi-stage weld process includes a first weld stage having a first weld current for melting the polymer and a second weld stage including a second weld current higher than the first weld current for fusing the substrate to the composite material.

For the above examples, similar results are expected when any of the values provided in the examples are varied by 10%, 20%, or 30%.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

As used herein the terms "polymer" and "polymerization" are generic, and can include either or both of the more specific cases of "homo-" and copolymer" and "homo- and copolymerization", respectively.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A process of forming a weld joint comprising the steps of:
   providing a substrate material, wherein the substrate material is a metallic material;
   providing a light weight composite material;
   placing the substrate material in contact with the light weight composite material to form a weld stack, and
   welding the light weight composite material directly to the substrate material; wherein the step of welding includes a step of applying a weld current from about 2.5 kA to about 25 kA to the substrate material and the light weight composite material using electrodes of a resistance welding apparatus to weld the substrate material with the light weight composite material so that a weld is achieved characterized by a weld button having an area of about 1 $mm^2$ or more;
   wherein the light weight composite material includes a pair of spaced apart steel sheets having an area of overlap and a distance between the steel sheets, and a core layer having a thickness; wherein the light weight composite material includes a space between the pair of spaced apart steel sheets having a volume defined by the area of overlap and the distance between the steel sheets, wherein the core layer is in the space between the steel sheets;
   the core layer is present at a concentration from about 25 to about 95 volume percent, based on the total volume of the light weight composite material;
   the total volume of the steel sheets of the light weight composite material is from about 5% to about 75%, based on the total volume of the light weight composite material;
   the core layer includes a polymeric matrix and a plurality of steel fibers arranged in one or more masses of fibers that extend the thickness of the core layer so that the core layer is in electrical communication with the steel sheets, wherein less than 40% of the steel fibers span individually the thickness of the core layer; and
   the steel fibers have a length of about 200 μm or more and less than 7 mm;
   the steel fibers have a cross-section perpendicular to the length of the steel fibers having a cross-sectional area from about $1\times10^{-5}$ $mm^2$ to about $2.5\times10^{-2}$ $mm^2$, and the cross-section perpendicular to the length of the steel fibers has a width, a thickness, and one or more straight sides;
   wherein the polymeric matrix includes one or more polymers and the core layer has a volume ratio of the polymer to the steel fibers that is greater than 2.5:1, the steel fibers are present at a concentration greater than about 10 percent by volume, based on the total volume of the core layer of the light weight composite material; and the core layer fills at least about 90 volume percent of the space between the pair of spaced apart steel sheets; the one or more polymers includes a polyolefin;
   the core layer is free of voids and pores,
   wherein the light weight composite material has a stamped configuration.

* * * * *